(12) United States Patent  (10) Patent No.: US 7,416,032 B2
Moeny et al.                (45) Date of Patent:     Aug. 26, 2008

(54) PULSED ELECTRIC ROCK DRILLING APPARATUS

(75) Inventors: William M. Moeny, Rio Rancho, NM (US); Gilman Hill, Englewood, CO (US)

(73) Assignee: Tetra Corporation, Albuquerque, NM (US)

( * ) Notice: Subject to any disclaimer, the term of this patent is extended or adjusted under 35 U.S.C. 154(b) by 393 days.

(21) Appl. No.: 11/208,671

(22) Filed: Aug. 19, 2005

(65) Prior Publication Data

US 2006/0037779 A1    Feb. 23, 2006

Related U.S. Application Data

(60) Provisional application No. 60/603,509, filed on Aug. 20, 2004.

(51) Int. Cl.
    *E21B 7/15*     (2006.01)
(52) U.S. Cl. ..................................... 175/16
(58) Field of Classification Search ............... 175/16; 299/14
    See application file for complete search history.

(56) References Cited

U.S. PATENT DOCUMENTS

| | | | | |
|---|---|---|---|---|
| 2,822,148 A | * | 2/1958 | Murray | 175/15 |
| 3,158,207 A | * | 11/1964 | Rowley | 175/16 |
| 3,500,942 A | * | 3/1970 | Smith, Jr. | 175/16 |
| 3,679,007 A | * | 7/1972 | O'Hare | 175/16 |
| 3,715,082 A | | 2/1973 | Carley-Macauly et al. | |
| 3,840,078 A | * | 10/1974 | Allgood et al. | 175/15 |
| 4,540,127 A | | 9/1985 | Andres | |
| 4,741,405 A | | 5/1988 | Moeny et al. | |
| 5,386,877 A | | 2/1995 | Codina et al. | |
| 5,425,570 A | * | 6/1995 | Wilkinson | 299/14 |
| 5,573,307 A | | 11/1996 | Wilkinson et al. | |
| 5,685,377 A | | 11/1997 | Arstein et al. | |
| 5,896,938 A | | 4/1999 | Moeny et al. | |
| 6,145,934 A | | 11/2000 | Arai et al. | |
| 6,164,388 A | * | 12/2000 | Martunovich et al. | 175/1 |

FOREIGN PATENT DOCUMENTS

WO        03/069110       8/2003
WO        WO03/069110     8/2003

OTHER PUBLICATIONS

"Diekektrol-II Fluid", *GE Company Material Safety Data Sheet*, (Mar. 25, 1996).
"Dielectric Electrical Properties Polyglycols", *ChemPoint.com*.
"Dielektrol-I Fluid", *GE Company Material Safety Data Sheet*, (Mar. 25, 1996).

(Continued)

*Primary Examiner*—Hoang Dang
(74) *Attorney, Agent, or Firm*—Deborah A. Peacock; Vidal A. Oaxaca; Peacock Myers, P.C.

(57) ABSTRACT

The present invention provides for pulsed powered drilling apparatuses and methods. A drilling apparatus is provided comprising a bit having one or more sets of electrodes through which a pulsed voltage is passed through a mineral substrate to create a crushing or drilling action.

45 Claims, 33 Drawing Sheets

OTHER PUBLICATIONS

"Dielektrol-III Fluid", *GE Company Material Safety Data Sheet*, (Mar. 25, 1996).
"Dielektrol-IV Fluid", *GE Company Material Safety Data Sheet*, (May 23, 1996).
"Dielektrol-V Fluid", *GE Company Material Safety Data Sheet*, (Mar. 25, 1996).
"Dielektrol-VI Fluid", *GE Company Material Safety Data Sheet*, (Dec. 7, 1999).
"Dielektrol-VII Fluid", *GE Company Material Safety Data Sheet*, (Nov. 2, 1999).
"Geconol", *GE Company Material Safety Data Sheet*, (Mar. 25, 1996).
"ICOA Technical Bulletins", www.icoa.org.
"Polycin TC", *Caschem*.
"Spark Drills", *Advanced Drilling Techniques*, 508-540.
Akhmetov, I. G., et al., "The effect of a hydroelectric discharge on the capacitance and filtration properties of rocks", *Izv. Akad. Nauk Az. SSR, Ser. Nauk Zemie*, (1983),128-131.
Andres, U., "Electrical Disintegration of Rock", *Mineral Processing and Extractive Metallurgy Review*, 1995, vol. 14, (1995),87-110.
Andres, U., et al., "Liberation of Mineral Constituents by High-Voltage Pulses", *Powder Technology*, 48, (1986),269-277.
Andres, U., et al., "Liberation of minerals by high-voltage electrical pulses", *Powder Technology 104*, (Dec. 29, 1998),37-49.
Andrews, U. T., "Liberation Study of Apatite Nepheline Ore Comminuted by Penetrating Electrical Discharges", *International Journal of Mineral Processing*, 4, (1977),33-38.
Andres, U., "Parameters of disintegration of rock by electrical pulses", *Powder Technol v. 58*, n 4 Aug. 1989,265-269.
Bindeman, Ilya N., "Fragmentation phenomena in populations of magmatic crystals", *American Mineralogist*, vol. 90, (2005), 1801-1815.
Bluhm, H., et al., "Application of Pulsed HV Discharges to Material Fragmentation and Recycling", *IEEE Transactions on Dielectrics and Electrical Insulation*, vol. 7, No. 5, (Oct. 2000),625-636.
Broyer, P., et al., "New discharge circuit using high voltage transmission line for efficient shock wave generation; application to lithotripsy", *IEEE Ultrasonics Symposium v 3*, (1994).
Chaturvedi, Shashank, et al., "Modeling of shock-wave generation in water by electrical discharges", *IEEE Trans Plasma Sci*, vol. 28, No. 5, (Oct. 2000), 1552-1557.
Cook, N.G.W., et al., "Rock Fragmentation by Mechanical, Chemical and Thermal Methods", *VI International Mining Congress*, (1970),1-5.
Dubovenko, K. V., et al., "Underwater electrical discharge characteristics at high values of initial pressure and temperature", *IEEE International Conference on Plasma Science* 1998.
Furujo, A., "Current Trends of Plasma Cutting Technology", *Yosetsu Gakkai-Shi (Journal of the Japan Welding Society)*, Vo. 66, No. 7, (Oct. 5, 1997),33-37.
Hamelin, M., et al., "Hard Rock Fragmentation with Pulsed Power", 1993 *Pulsed Power Conference*, (1993),11-14.
Hasebe, T., et al., "Focusing of Shock Wave by Underwater Discharge, On Nonlinear Reflection and Focusing Effect", *Zairyo (Journal of the Society of Materials Science, Japan)*, vol. 45., No. 10, (Oct. 15, 1996),1151-1156.
Hawrylewicz, B. M., et al., "Experiment with Electric Discharge in Rock Splitting", *Society of Mining Engineers of AIME conference*, (1986),429-435.
Hawrylewicz, B. M., et al., "Experiment with Electric Discharge in Rock Splitting", *Symposium on Rock Mechanics 27th. Publ by Soc of Mining Engineers of AIME*, (1986).
Hawrylewicz, B. M., et al., "Experiment with electric discharge in rock splitting", *Symposium on Rock Mechanics*, vol. 27, (Jun. 1986),429-435.
Hogeland, Steve R., et al., "Aluminum-Enhanced Underwter Electrical Discharges for Steam Explosion Triggering", *Sandia National Labs*.
Huismann, G., et al., "Arc Voltage Measurements of the Hyperbaric MIG Process", 14, *International Conference on Offshore Mechanics Arctic Engineering (OMAE)*, (Jun. 1996).

Inoue, Hirotoshi, et al., "Drilling of Hard Rocks by Pulsed Power", *2000IEEE*, vol. 16, No. 3, (Jun. 2000),19-25.
Inoue, Hirotoshi, et al., "Pulsed Electric Breakdown and Destruction of Granite", *Jp. J. Appl. Phys.* vol. 38, (Nov. 1, 1999),6502-6505.
Ivanov, V. V., et al., "Discharge-pulse technology of development of sulphidic ores at the bottom of ocean. The Part II", *Elektronnaya Obrabotka Materialov*, No. 1, (2002),57-63.
Kalyatskij, I. I., et al., "Optimization of wear of electrode systems under rock crushing by discharge-producing electrical pulses", *Elektron Obr Mater n 01* Jan.-Feb. 1991,43-45.
Kil'keyev, R., et al., "Aspects of absorption of microwave energy by frozen rock", (May 1, 1981),20-21.
Komatsubara, A., "Recent trend of new flue gas treating technology", *R and D News Kansai*, (1993),33-35.
Kudo, K., et al., "Application of the Electric Discharge Logging System", *SEGJ Conference*, (Oct. 1997).
Kudo, K., et al., "Features of the Electric Discharge Logging System", *SEGJ Conference*, (Oct. 1997).
Kumazaki, K., et al., "Production of Artificial Fulgurite by Utilizing Rocket Triggered Lightning", *Denki Gakkai Ronbunshi, A (Transactions of the Institute of Electrical Engineers of Japan, Fundamentals and Materials)*, vol. 117, No. 10, (Sep. 20, 1997).
Lisitsyn, I.V., et al., "Breakdown and destruction of heterogeneous solid dielectrics by high voltage pulses", *1998 American Institute of Physics*, (Sep. 10, 1998),6262-6267.
Lisitsyn, I. V., et al., "Role of electron clusters-Ectons-in the breakdown of solid dielectrics", *Physics of Plasma*, vol. 5, No. 12, (Dec. 1998),4484-4487.
Listisyn, I.V., et al., "Drilling and Demolition of Rocks by Pulsed Power", *IEEE*, (1999), 169-172.
Malyushevskij, P. P., et al., "Discharge-pulse technology of ming of sulphide ores on the bottom of the Ocean", *Elektronnaya Obrabotka Meterialov*, No. 2, (2002),45-57.
Malyushevskij, P. P., et al., "Discharge-pulse technology of mining of sulfidic ores at the bottom of ocean. Part I.", *Elektronnaya Obrabotka Materialov*, (2001),41-49.
Matsumoto, Takaaki, "Acceleration methods of Itonic clusters", *Japan Synchrotron Radiation*, (Jul. 14, 2000).
Matsumoto, Takaaki, "Feasibility of X-ray Laser by Underwater Spark Discharges", *Japan Atomic Energy Research Inst.*, (Nov. 1999).
McClung, J. G., "The feasibility of developing a borehole sparker for geothermal wells", *EG and G Energy Measurements, Inc.*, (1997).
Mozumi, H., et al., "Tunnel blastic with non-electric detonators in the Kamioka mine", *Kogyo Kayaku* (Japan, vol. 54, No. 1, (Feb. 25, 1993),44-49.
No Author, "Proceedings of the 23rd International Conference of Safety in Mines Research Institutes; Abstracts", *International Conference of Safety in Mines Research Institutes*, (1989).
No Author, "Proceedings of the eighteenth annual conference on explosives and blasting technique", *International Society of Explosives Engineers*, (1992).
Ploeger, M., et al., "Optimisation of the core shroud bypass flow in the nuclear power plant Unterweser, Part 2: Hardway Implementation", 9, *International Conference on Nuclear Engineering, Nice Acropolis* (France), (Jul. 1, 2001).
Pronko, S., et al., "Megajoule Pulsed Power Experiments for Plasma Blasting Mining Applications", *1993 Pulsed Power Conference*, (1993),15-18.
Puharic, M., et al., "Overvoltage Analysis on Submarine Cables of Atmospheric Origins and Due to Switching Operations", *CIRED: 14, International Conference and Exhibition on Electricity Distribution: Distributing Power for the Millennium*, (Jun. 1997).
Res, J., et al., "Disintegration of hard rocks by the electrohydrodynamic method", *Mining Engineer*, 44 Jan. 1987,44-47.
Saini-Eidukat, Bernhardt, et al., "Liberation of Fossils Using High Voltage Electric Pulses", *Curator*, vol. 39, (1996),139-144.
Saprykin, Yu, et al., "Deformation of a spherical shell under internal loading by a shock generated by an underwater electrical discharge", *Sov Appl Mech*, (Oct. 1988),392-396.

Timoshkin, I.V., et al., "Plasma Channel Microhole Drilling Technology", *Applied Electrical Technologies Group, Institute for Energy and Environment Department of Electronic & Electrical Engineering, University of Strathclyde*, Abstract No. 10774.

Vovchenko, A. I., et al., "Underwater pulse discharge (UPD) and its technological applications", *Proc 3 Int Conf Prop Appl Dielectr Mater. Publ by IEEE*, (1991),1254-1257.

Weise, TH.H.G.G., et al., "Experimental investigations on rock fractioning by replacing explosives with electrically generated pressure pulses", *IEEE International Pulsed Power Conference—Digest of Technical papers v 1 1993*.

Yokawa, S., et al., "Pulse energization system applied for fluidized bed combustors", *Sumitomo Jukikai Giho*, (Apr. 20, 1993),85-89.

et al., "Plasma blasting in the Canadian Mining Industry", *Energy, Mines and Resources, Energy Diversification Research Laboratory, Cadet Newsletter* No. 4 Dec. 1990 , 1-4.

* cited by examiner

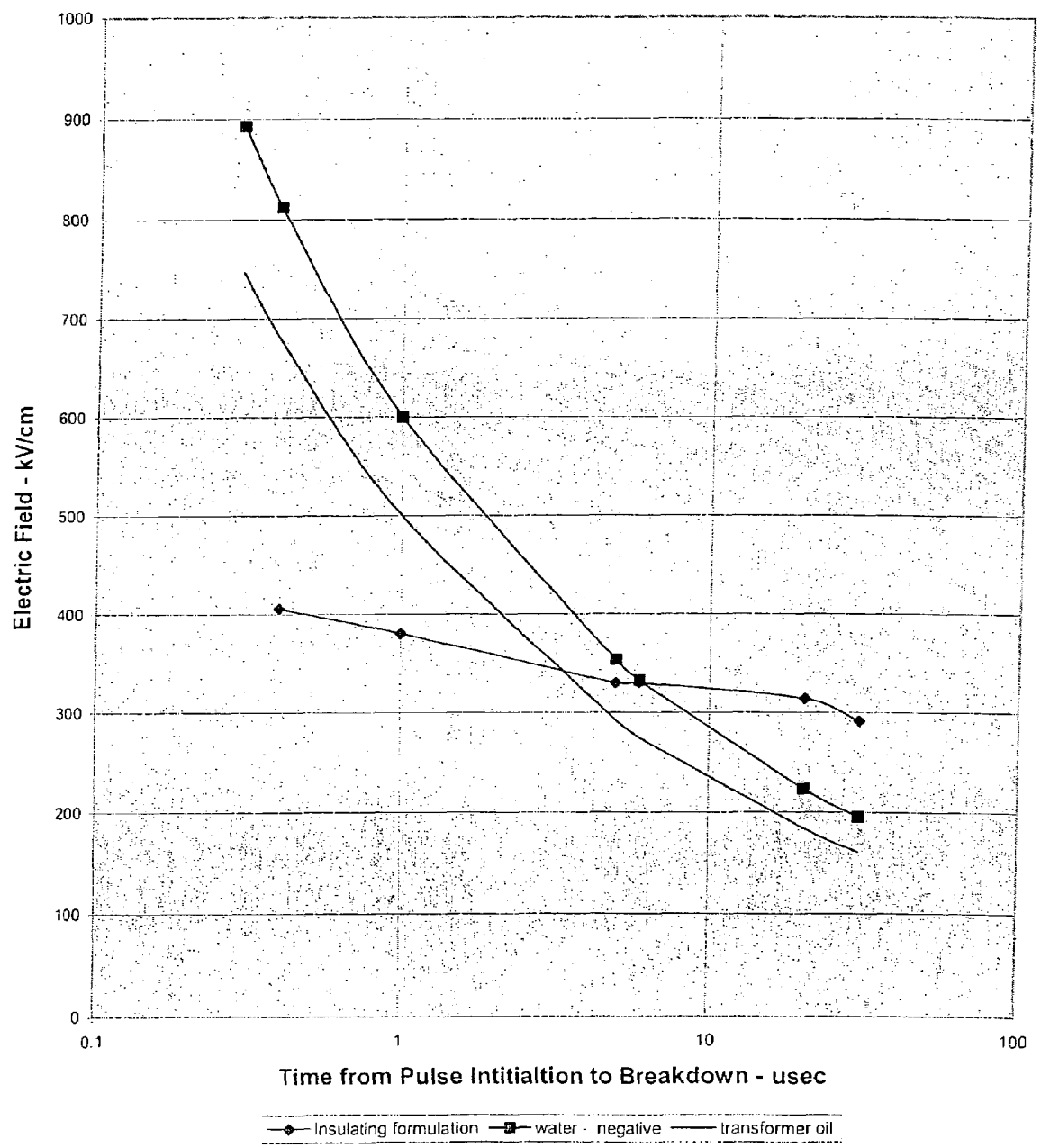

PULSED ELECTRIC ROCK DRILLING APPARATUS

CROSS-REFERENCE TO RELATED APPLICATIONS

This application claims the benefit of the filing of U.S. Provisional Patent Application Ser. No. 60/603,509, entitled "Electrocrushing FAST Drill and Technology, High Relative Permittivity Oil, High Efficiency Boulder Breaker, New Electrocrushing Process, and Electrocrushing Mining Machine", filed on Aug. 20, 2004, and the specification of that application is incorporated herein by reference.

This application is also related to: U.S. utility application Ser. No. 11/208,766 entitled "High Permittivity Fluid", U.S. utility application Ser. No. 11/208,579 entitled "Electrohydraulic Boulder Breaker", and U.S. utility application Ser. No. 11/208,950 entitled "Virtual Electrode Mineral Particle Disintegrator", all of which are being filed concurrently herewith, and the specification and claims of those applications are incorporated herein by reference.

BACKGROUND OF THE INVENTION

1. Field of the Invention (Technical Field)

The present invention relates to pulse powered drilling apparatuses and methods. The present invention also relates to insulating fluids of high relative permittivity (dielectric constant).

2. Background Art

Processes using pulsed power technology are known in the art for breaking mineral lumps. FIG. 1 shows a process by which a conduction path or streamer is created inside rock to break it. An electrical potential is impressed across the electrodes which contact the rock from the high voltage electrode 100 to the ground electrode 102. At sufficiently high electric field, an arc 104 or plasma is formed inside the rock 106 from the high voltage electrode to the low voltage or ground electrode. The expansion of the hot gases created by the arc fractures the rock. When this streamer connects one electrode to the next, the current flows through the conduction path, or arc, inside the rock. The high temperature of the arc vaporizes the rock and any water or other fluids that might be touching, or are near, the arc. This vaporization process creates high-pressure gas in the arc zone, which expands. This expansion pressure fails the rock in tension, thus creating rock fragments.

The process of passing such a current through minerals is disclosed in U.S. Pat. No. 4,540,127 which describes a process for placing a lump of ore between electrodes to break it into monomineral grains. As noted in the '127 patent, it is advantageous in such processes to use an insulating liquid that has a high relative permittivity (dielectric constant) to shift the electric fields away from the liquid and into the rock in the region of the electrodes.

The '127 patent discusses using water as the fluid for the mineral disintegration process. However, insulating drilling fluid must provide high dielectric strength to provide high electric fields at the electrodes, low conductivity to provide low leakage current during the delay time from application of the voltage until the arc ignites in the rock, and high relative permittivity to shift a higher proportion of the electric field into the rock near the electrodes. Water provides high relative permittivity, but has high conductivity, creating high electric charge losses. Therefore, water has excellent energy storage properties, but requires extensive deionization to make it sufficiently resistive so that it does not discharge the high voltage components by current leakage through the liquid. In the deionized condition, water is very corrosive and will dissolve many materials, including metals. As a result, water must be continually conditioned to maintain the high resistivity required for high voltage applications. Even when deionized, water still has such sufficient conductivity that it is not suitable for long-duration, pulsed power applications.

Petroleum oil, on the other hand, provides high dielectric strength and low conductivity, but does not provide high relative permittivity. Neither water nor petroleum oil, therefore, provide all the features necessary for effective drilling.

Propylene carbonate is another example of such insulating materials in that it has a high dielectric constant and moderate dielectric strength, but also has high conductivity (about twice that of deionized water) making it unsuitable for pulsed power applications.

In addition to the high voltage, mineral breaking applications discussed above, Insulating fluids are used for many electrical applications such as, for example, to insulate electrical power transformers.

There is a need for an insulating fluid having a high dielectric constant, low conductivity, high dielectric strength, and a long life under industrial or military application environments.

Other techniques are known for fracturing rock. Systems known in the art as "boulder breakers" rely upon a capacitor bank connected by a cable to an electrode or transducer that is inserted into a rock hole. Such systems are described by Hamelin, M. and Kitzinger, F., *Hard Rock Fragmentation with Pulsed Power*, presented at the 1993 Pulsed Power Conference, and Res, J. and Chattapadhyay, A, "Disintegration of Hard Rocks by the Electrohydrodynamic Method" Mining Engineering, January 1987. These systems are for fracturing boulders resulting from the mining process or for construction without having to use explosives. Explosives create hazards for both equipment and personnel because of fly rock and over pressure on the equipment, especially in underground mining. Because the energy storage in these systems are located remotely from the boulder, efficiency is compromised. Therefore, there is a need for improving efficiency in the boulder breaking and drilling processes.

Another technique for fracturing rock is the plasma-hydraulic (PH), or electrohydraulic (EH) techniques using pulsed power technology to create underwater plasma, which creates intense shock waves in water to crush rock and provide a drilling action. In practice, an electrical plasma is created in water by passing a pulse of electricity at high peak power through the water. The rapidly expanding plasma in the water creates a shock wave sufficiently powerful to crush the rock. In such a process, rock is fractured by repetitive application of the shock wave.

BRIEF SUMMARY OF THE INVENTION

The present invention is a pulsed power drilling apparatus and method for passing a pulsed electrical current through a mineral substrate to break a substrate. The apparatus and method preferably comprise a rotatable drill bit; a pulsed power generator linked to the drill bit for delivering high voltage pulses; and at least one set of at least two electrodes disposed on the drill bit defining therebetween at least one electrode gap. The electrodes of each set are preferably oriented substantially along a face of the drill bit. At least one of the electrodes is preferably disposed so that it touches the substrate. Another of the electrodes is preferably disposed so that it functions in close proximity to the substrate for current to pass through the substrate. At least one of the electrodes is preferably compressible toward the drill bit. The apparatus preferably further comprises a plurality of mechanical teeth disposed on the bit.

The apparatus further preferably comprises an insulating drilling fluid having an electrical conductivity less than approximately $10^{-5}$ mho/cm and a dielectric constant greater than approximately 6. The insulating fluid may comprise treated water having a conductivity less than approximately $10^{-5}$ mho/cm. The insulating fluid may comprise at least one oil. The insulating fluid preferably comprises a dielectric strength of at least approximately 300 kV/cm (1 μsec); a dielectric constant of at least approximately 15; and a conductivity of less than approximately $10^{-5}$ mho/cm.

The electrode sets preferably comprise an asymmetric configuration relative to the bit. The electrodes preferably comprise a coaxial configuration. Each set of electrodes preferably comprises a central electrode partially or fully surrounded by a ground electrode. The electrodes are preferably radiused on a side of the electrodes that contact the substrate.

The bit is preferably substantially conical in shape. The electrodes are preferably configured on the bit to form a dual angle.

The apparatus may further comprise a rotary drill reamer. This reamer preferably includes, but is not limited to, a drag bit, a tapered drag bit, and/or a rotary bit. At least one set of electrodes may be disposed at a longitudinal center of the bit. Or, the set of electrodes may be disposed off-center of rotation of the bit.

The apparatus may further comprise a conduit or a cable to send power to the drill bit. A pulsed power system may be disposed on the drill bit for conditioning electrical current received by the drill bit. The apparatus may further comprise a rotating interface to deliver pulsed power to the drill bit via the cable.

The apparatus may further comprise a solid state switch controlled pulse forming system, a gas switch controlled pulse forming system, and/or a piezoelectric power generator. The power generator may comprise a fuel cell. The power generator preferably delivers high voltage pulses of at least approximately 100 kV.

The apparatus preferably further comprises passages disposed in the bit and in which a flow of fluid is disposed for flushing debris.

The present invention is also a pulsed power drilling apparatus and method for passing a pulsed electrical current through a mineral substrate to break the substrate. The apparatus and method preferably comprise a drill bit; a pulsed power generator linked to the drill bit for delivering high voltage pulses; and at least one set of at least two electrodes disposed on the drill bit defining therebetween at least one electrode gap. The electrodes of each set are preferably oriented substantially parallel to one another along a face of the drill bit. The apparatus and method further comprise an insulating drilling fluid having an electrical conductivity less than that of water. Preferred components or parameters are discussed above.

The present invention is also a pulsed power drilling apparatus and method for passing a pulsed electrical current through a mineral substrate to break a substrate. The apparatus and method preferably comprise a drill bit; at least one set of at least two electrodes disposed on the drill bit defining therebetween at least one electrode gap; a pulsed power generator linked to the drill bit for delivering high voltage pulses; and a passage for delivering water down the drilling apparatus.

A first of the electrodes and a second of the electrodes may be a center electrode. The center electrode is preferably compressible.

A cable preferably connects the generator to at least one of the electrodes. The invention preferably further comprises a drill stem assembly within which the electrodes are enclosed.

The invention is also an apparatus and method for mining rock comprising a plurality of electrocrushing drill bits arranged in an array. The invention preferably further comprises a plurality of electrohydraulic drill bits arranged in the array.

The present invention further comprises a method for breaking and drilling a mineral substrate. The method preferably comprises providing a drill bit; disposing at least one set of electrodes on the drill bit; rotating the drill bit; and delivering a pulsed power current between the electrodes and through the substrate to break the substrate, at least one set of at least two electrodes disposed on the drill bit defining therebetween at least one electrode gap, orienting the electrodes of each the set substantially along a face of the drill bit, disposing at least one of the electrodes so that it touches the substrate and another of the electrodes is disposed so that it functions in close proximity to the substrate for current to pass through the substrate. The method preferably further comprises disposing a drilling fluid about the substrate to be drilled.

The present invention further comprises a method for breaking and drilling a mineral substrate. The method preferably comprises providing a drill bit; disposing at least one set of electrodes on the drill bit; disposing a drilling fluid about the substrate to be acted upon by the drill bit; rotating the drill bit; and delivering a pulsed power current between the electrodes and through the substrate to break the substrate.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 32 is a graph showing dielectric strength versus delay to breakdown of the insulating formulation of the present invention, oil, and water.

DETAILED DESCRIPTION OF THE INVENTION

The present invention provides for pulsed power breaking and drilling apparatuses and methods. As used herein, "drilling" is defined as excavating, boring into, making a hole in, or otherwise breaking and driving through a substrate. As used herein, "bit" and "drill bit" are defined as the working portion or end of a tool that performs a function such as, but not limited to, a cutting, drilling, boring, fracturing, or breaking action on a substrate (e.g., rock). As used herein, the term "pulsed power" is that which results when electrical energy is stored (e.g., in a capacitor or inductor) and then released into the load so that a pulse of current at high peak power is produced. "Electrocrushing" ("EC") is defined herein as the process of passing a pulsed electrical current through a mineral substrate so that the substrate is "crushed" or "broken".

Electrocrushing Bit

An embodiment of the present invention provides a drill bit on which is disposed one or more sets of electrodes. In this embodiment, the electrodes are disposed so that a gap is formed between them and are disposed on the drill bit so that they are oriented along a face of the drill bit. In other words, the electrodes between which an electrical current passes through a mineral substrate (e.g., rock) are not on opposite sides of the rock. Also, in this embodiment, it is not necessary that all electrodes touch the mineral substrate as the current is being applied. In accordance with this embodiment, at least one of the electrodes extending from the bit toward the substrate to be fractured and may be compressible (i.e., retractable) into the drill bit by any means known in the art such as, for example, via a spring-loaded mechanism.

Generally, but not necessarily, the electrodes are disposed on the bit such that at least one electrode contacts the mineral substrate to be fractured and another electrode that usually touches the mineral substrate but otherwise may be close to, but not necessarily touching, the mineral substrate so long as it is in sufficient proximity for current to pass through the mineral substrate. Typically, the electrode that need not touch the substrate is the central, not the surrounding, electrode.

Therefore, the electrodes are disposed on a bit and arranged such that electrocrushing arcs are created in the rock. High voltage pulses are applied repetitively to the bit to create repetitive electrocrushing excavation events. Electrocrushing drilling can be accomplished, for example, with a flat-end cylindrical bit with one or more electrode sets. These electrodes can be arranged in a coaxial configuration.

Figure 1:
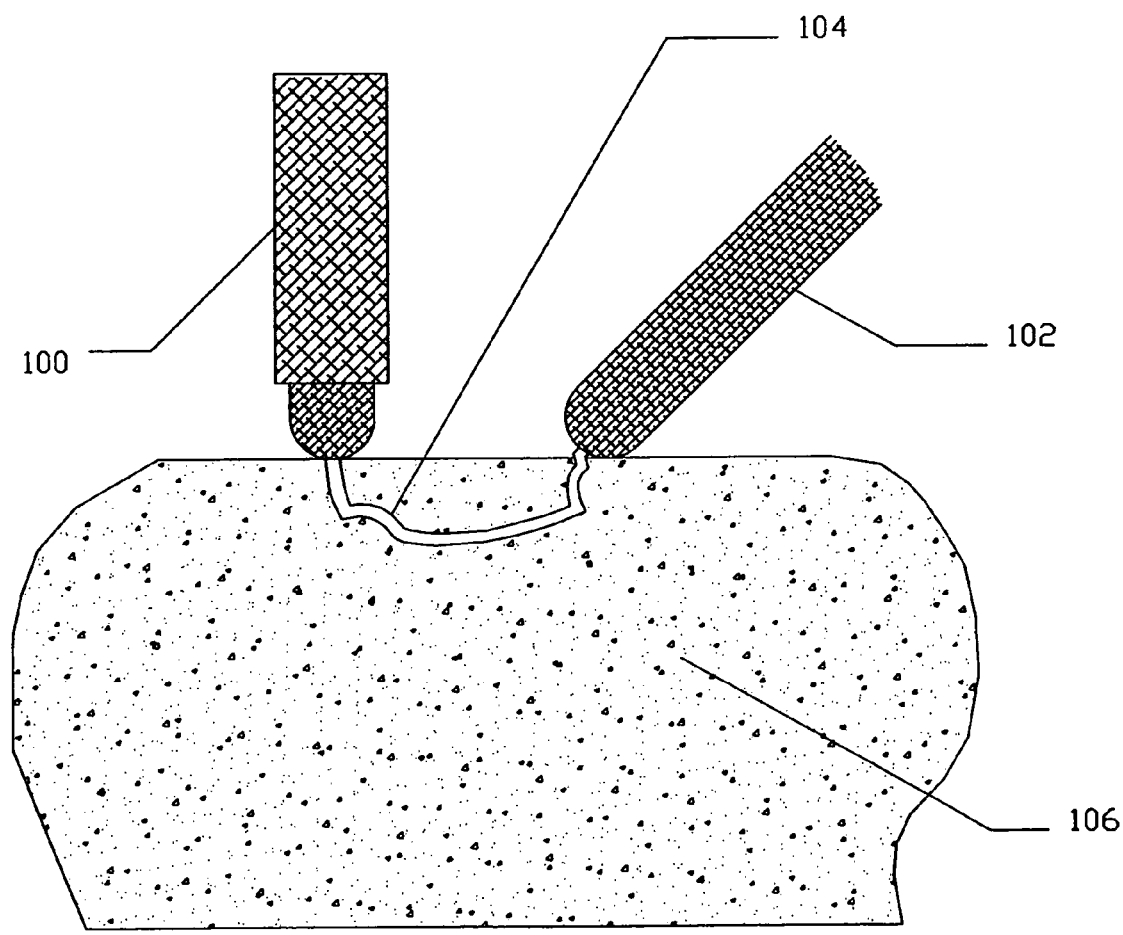
FIG. 1 shows an electrocrushing process of the prior art.
Figure 2:
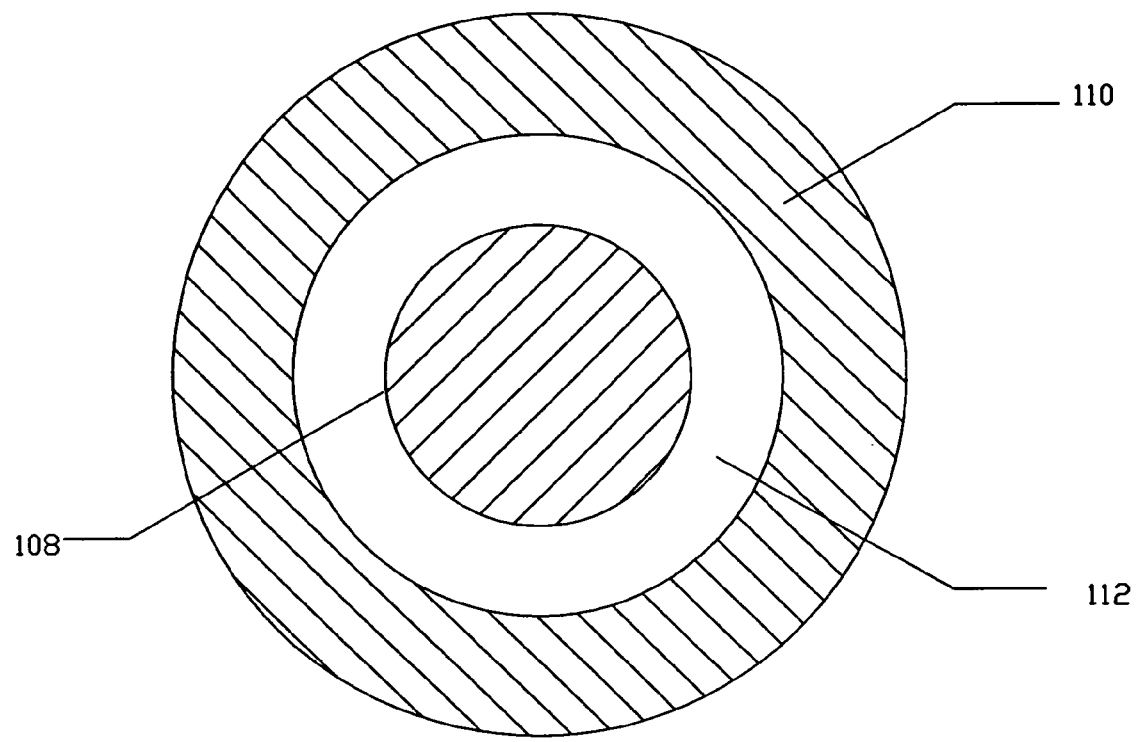
FIG. 2 shows an end view of a coaxial electrode set for a cylindrical bit of an embodiment of the present invention.
Figure 3:
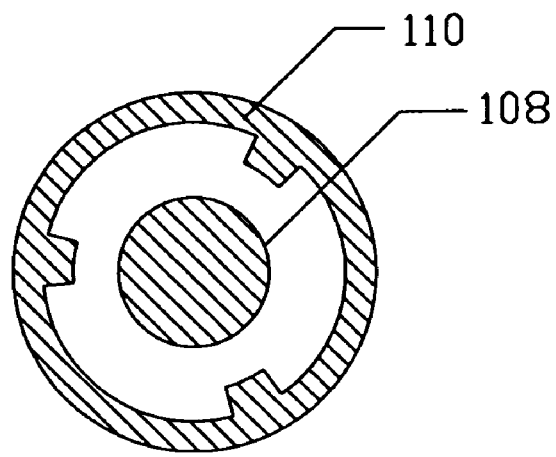
FIG. 3 shows an alternate embodiment of FIG. 2.
Figure 3:
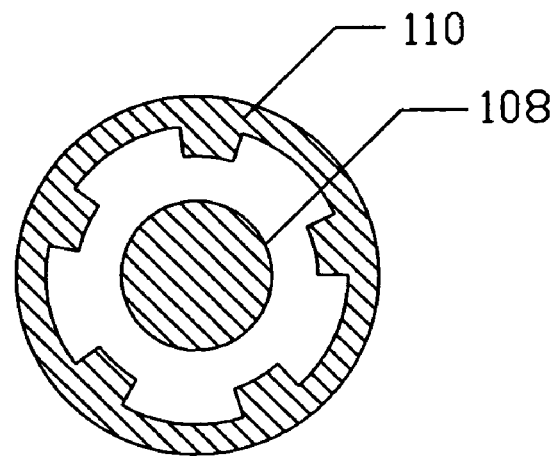
Figure 3:
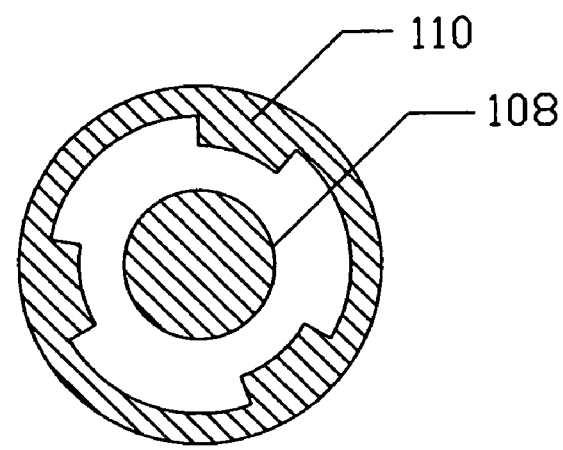
Figure 4:
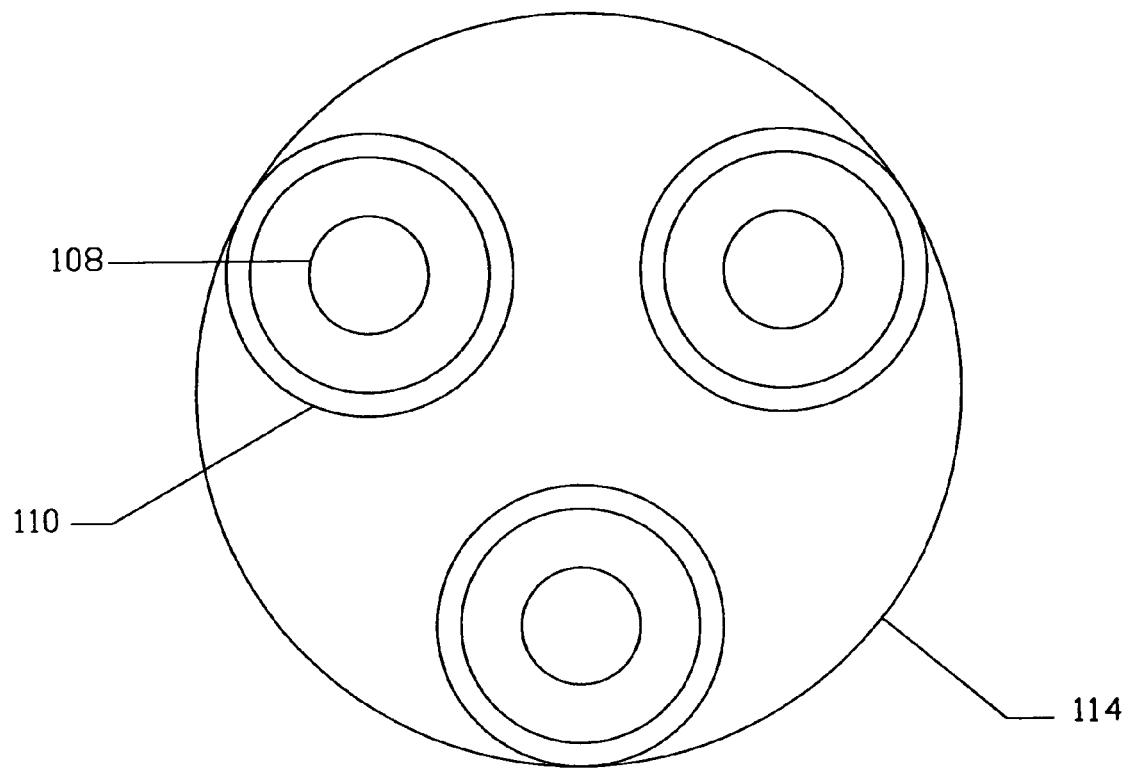
FIG. 4 shows an alternate embodiment of a plurality of coaxial electrode sets.

FIG. 2 shows an end view of such a coaxial electrode set configuration for a cylindrical bit, showing high voltage or center electrode 108, ground or surrounding electrode 110, and gap 112 for creating the arc in the rock. Variations on the coaxial configuration are shown in FIG. 3. A non-coaxial configuration of electrode sets arranged in bit housing 114 is shown in FIG. 4. FIGS. 3-4 show ground electrodes that are completed circles. Other embodiments may comprise ground electrodes that are partial circles, partial or compete ellipses, or partial or complete parabolas in geometric form.

Figure 5:
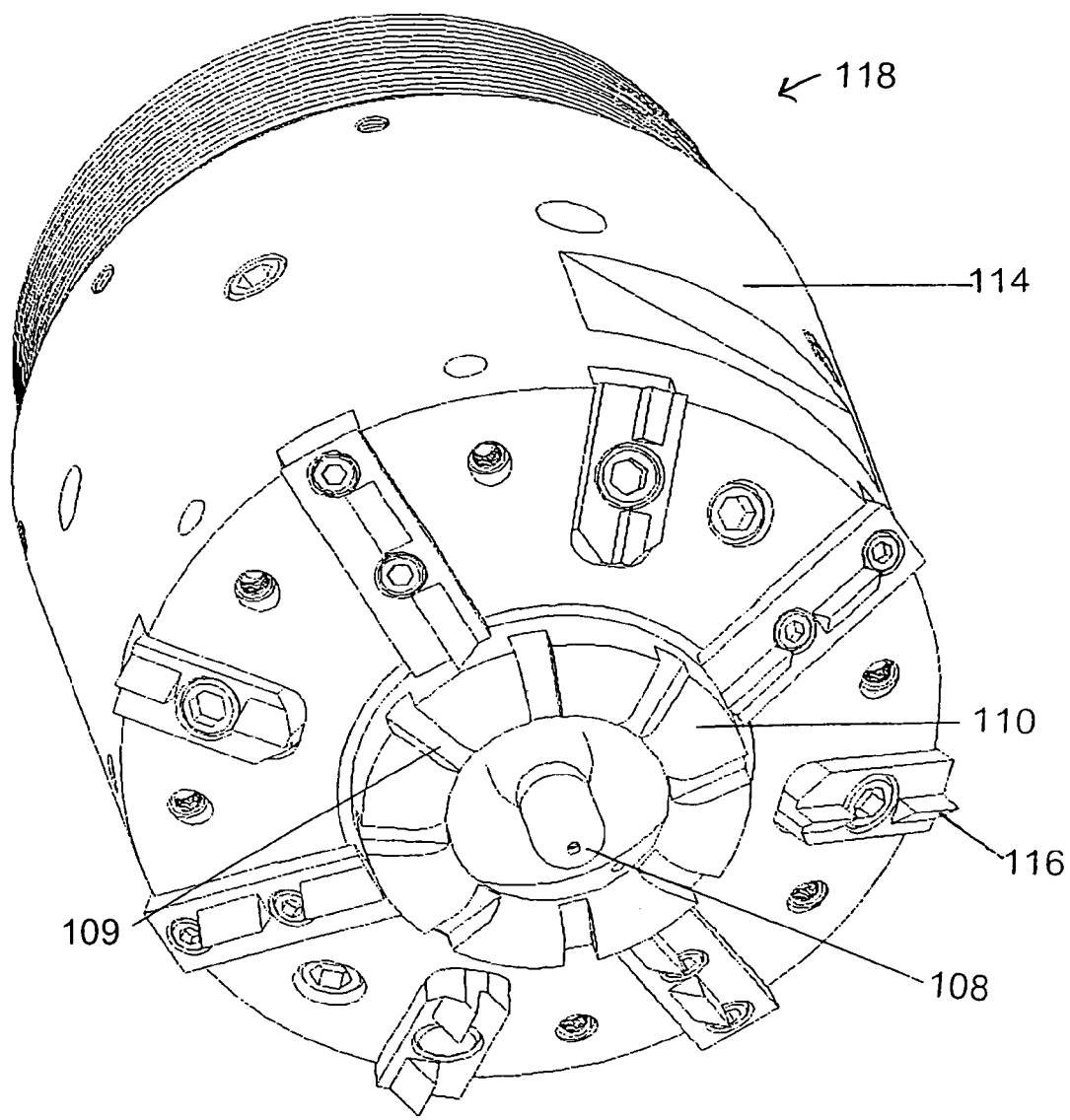
FIG. 5 shows a conical bit of an embodiment of the present invention.

For drilling larger holes, a conical bit is preferably utilized, especially if controlling the direction of the hole is important. Such a bit may comprise one or more sets of electrodes for creating the electrocrushing arcs and may comprise mechanical teeth to assist the electrocrushing process. One embodiment of the conical electrocrushing bit has a single set of electrodes, preferably arranged coaxially on the bit, as shown in FIG. 5. In this embodiment, conical bit 118 comprises a center electrode 108, the surrounding electrode 110, the bit case or housing 114 and mechanical teeth 116 for drilling the rock. Either, or both, electrodes may be compressible. The surrounding electrode preferably has mechanical cutting teeth 109 incorporated into the surface to smooth over the rough rock texture produced by the electrocrushing process. In this embodiment, the inner portion of the hole is drilled by the electrocrushing portion (i.e., electrodes 108 and 110) of the bit, and the outer portion of the hole is drilled by mechanical teeth 116. This results in high drilling rates, because the mechanical teeth have good drilling efficiency at high velocity near the perimeter of the bit, but very low efficiency at low velocity near the center of the bit. The geometrical arrangement of the center electrode to the ground ring electrode is conical with a range of cone angles from 180 degrees (flat plane) to about 75 degrees (extended center electrode).

An alternate embodiment is to arrange a second electrode set on the conical portion of the bit. In such an embodiment, one set of the electrocrushing electrodes operates on just one side of the bit cone in an asymmetrical configuration as exemplified in FIG. 6 which shows a dual-electrode set conical bit, each set of electrodes comprising center electrode 108, surrounding electrode 110, bit case or housing 114, mechanical teeth 116, and drilling fluid passage 120.

The combination of the conical surface on the bit and the asymmetry of the electrode sets results in the ability of the dual-electrode bit to excavate more rock on one side of the hole than the other and thus to change direction. For drilling a straight hole, the repetition rate and pulse energy of the high voltage pulses to the electrode set on the conical surface side of the bit is maintained constant per degree of rotation. However, when the drill is to turn in a particular direction, then for that sector of the circle toward which the drill is to turn, the pulse repetition rate (and/or pulse energy) per degree of rotation is increased over the repetition rate for the rest of the circle. In this fashion, more rock is removed by the conical surface electrode set in the turning direction and less rock is removed in the other directions (See FIG. 9, discussed in detail below). Because of the conical shape of the bit, the drill tends to turn into the section where greater amount of rock was removed and therefore control of the direction of drilling is achieved.

Figure 6:
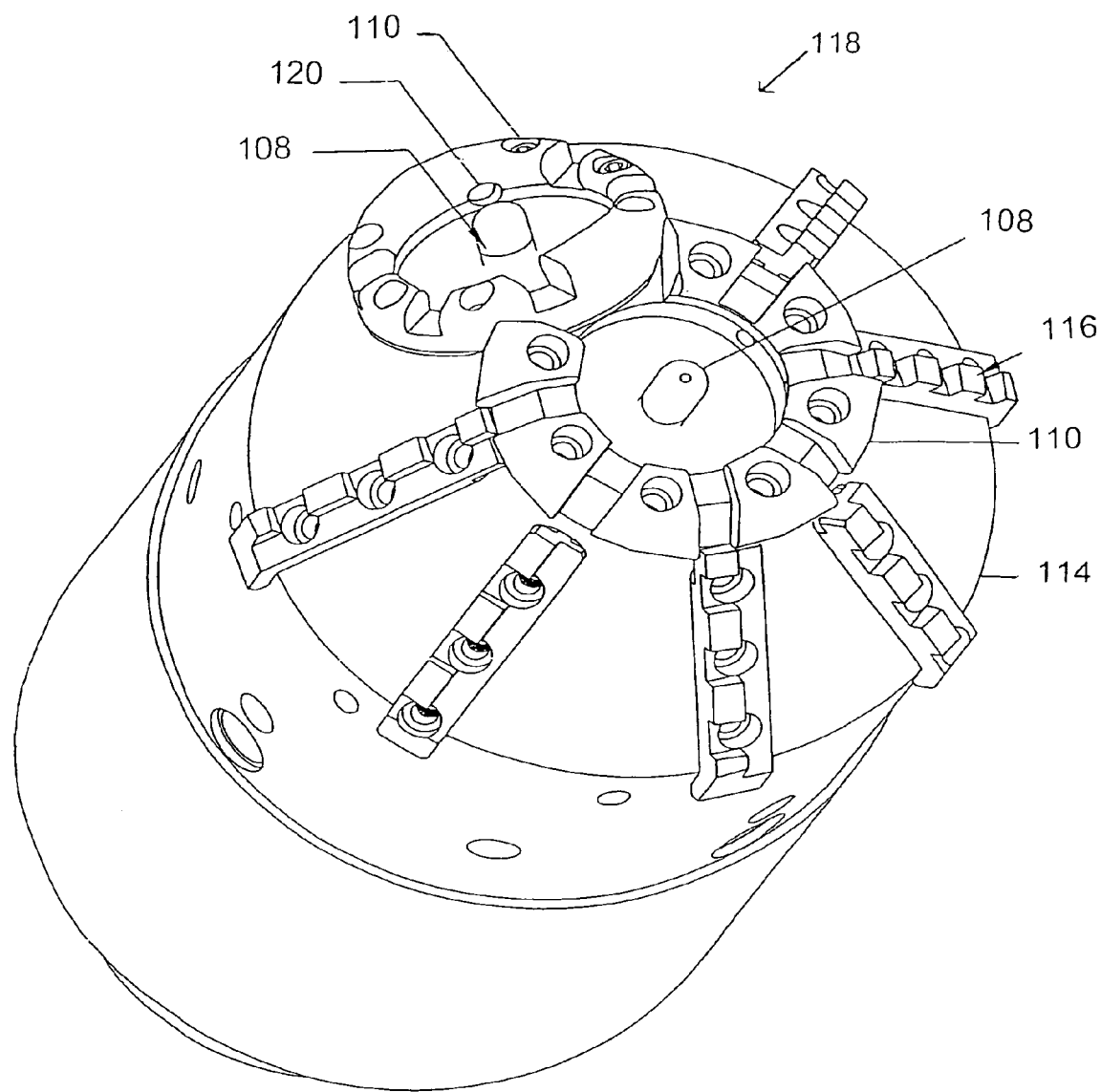
FIG. 6 is of a dual-electrode set bit of an embodiment of the present invention.

In the embodiment shown in FIG. 6, most of the drilling is accomplished by the electrocrushing (EC) electrodes, with the mechanical teeth serving to smooth the variation in surface texture produced by the EC process. The mechanical teeth 116 also serve to cut the gauge of the hole, that is, the relatively precise, relatively smooth inside diameter of the hole. An alternate embodiment has the drill bit of FIG. 6 without mechanical teeth 116, all of the drilling being done by the electrode sets 108 and 110 with or without mechanical teeth 109 in the surrounding electrode 110.

Figure 7:
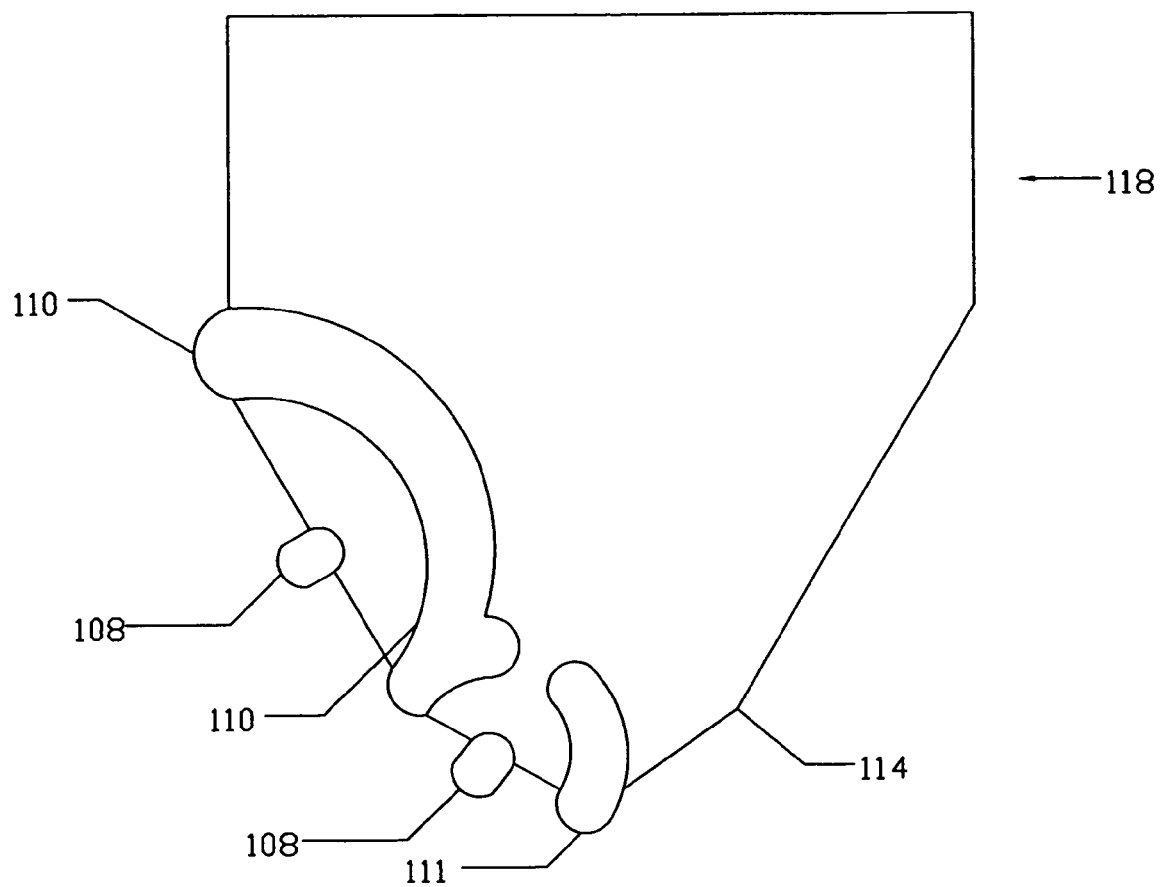
FIG. 7 is of a dual-electrode conical bit with two different cone angles of an embodiment of the present invention.

Alternative embodiments include variations on the configuration of the ground ring geometry and center-to-ground ring geometry as for the single-electrode set bit. For example, FIG. 7 shows such an arrangement in the form of a dual-electrode conical bit comprising two different cone angles with center electrodes 108, surrounding or ground electrodes 110, and bit case or housing 114. In the embodiment shown, the ground electrodes are tip electrode 111 and conical side ground electrodes 110 which surround, or partially surround, high voltage electrodes 108 in an asymmetric configuration.

Figure 8A:
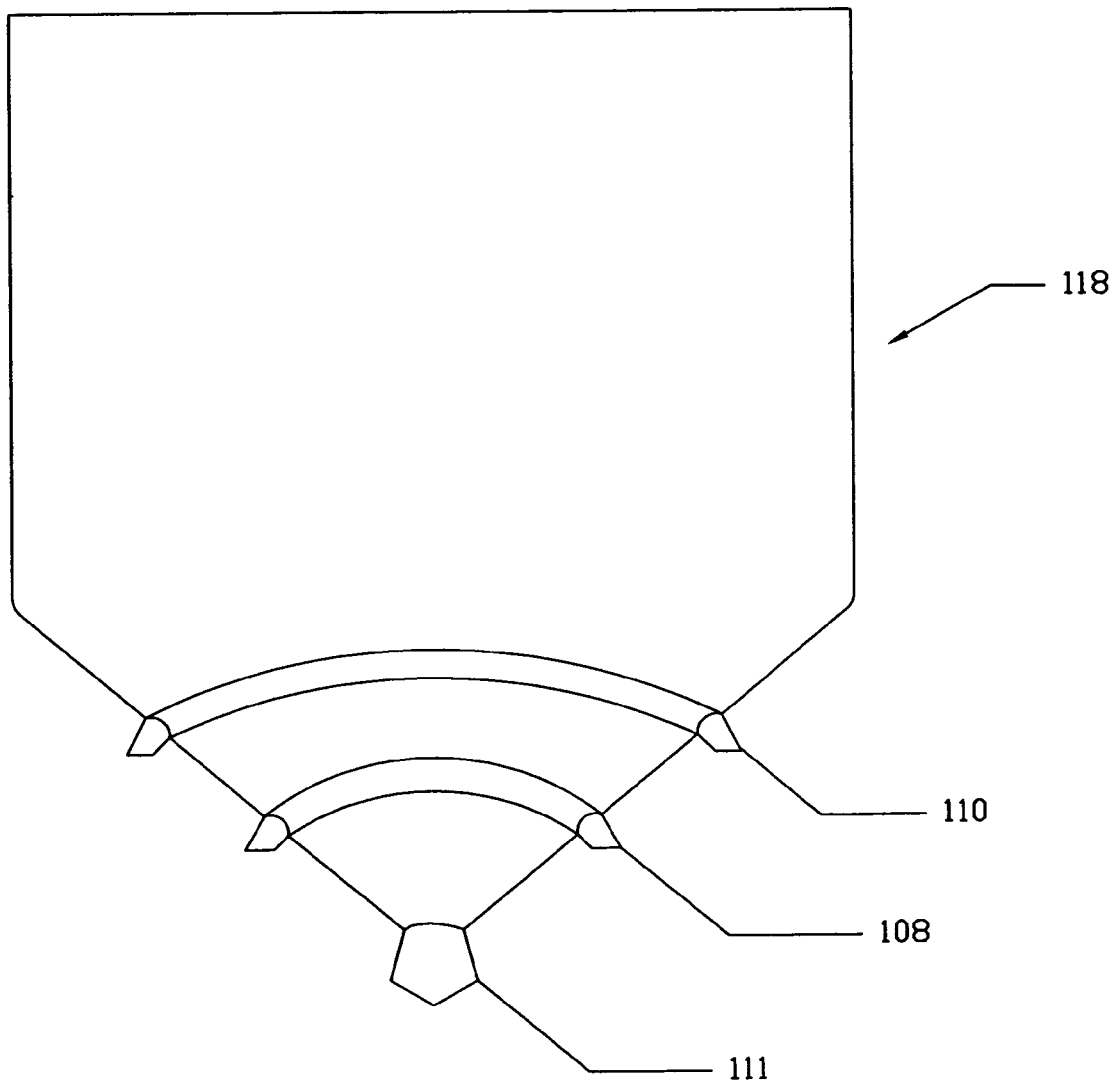
FIG. 8 shows an embodiment of a drill bit of the present invention wherein one ground electrode is the tip of the bit and the other ground electrode has the geometry of a great circle of the cone.
Figure 8B:
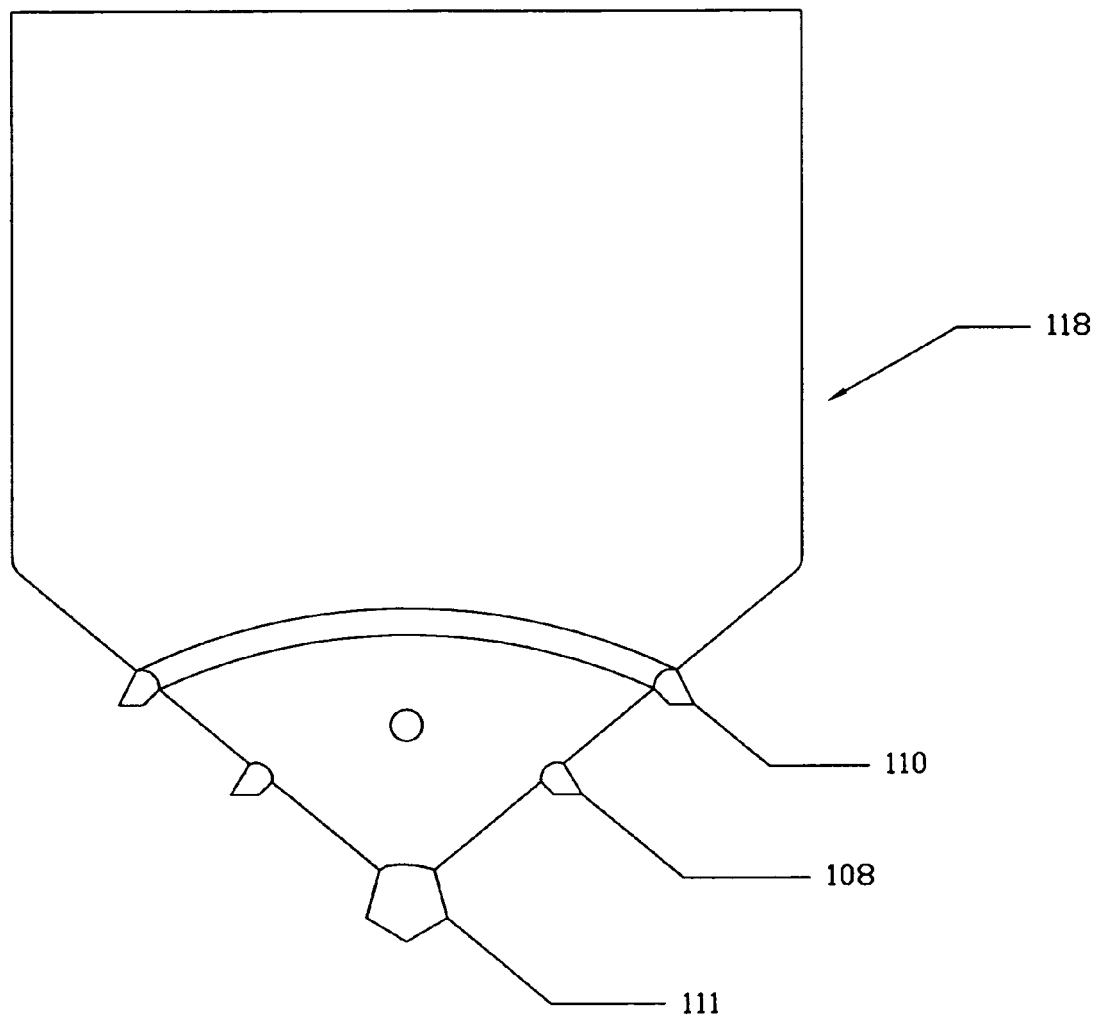

As shown in FIG. 7, the bit may comprise two or more separate cone angles to enhance the ability to control direction with the bit. The electrodes can be laid out symmetrically in a sector of the cone, as shown in FIG. 5 or in an asymmetric configuration of the electrodes utilizing ground electrode 111 as the center of the cone as shown in FIG. 7. Another configuration is shown in FIG. 8A in which ground electrode 111 is at the tip of the bit and hot electrode 108 and other ground electrode 110 are aligned in great circles of the cone. FIG. 8B shows an alternate embodiment wherein ground electrode 111 is the tip of the bit, other ground electrode 110 has the geometry of a great circle of the cone, and hot electrodes 108 are disposed there between. Also, any combination of these configurations may be utilized.

It should be understood that the use of a bit with an asymmetric electrode configuration can comprise one or more electrode sets and need not comprise mechanical teeth. It should also be understood that directional drilling can be performed with one or more electrode sets.

The EC drilling process takes advantage of flaws and cracks in the rock. These are regions where it is easier for the electric fields to breakdown the rock. The electrodes used in the bit of the present invention are usually large in area in order to intercept more flaws in the rock and therefore improve the drilling rate, as shown in FIG. 5. This is an important feature of the invention because most electrodes in the prior art are small to increase the local electric field enhancement.

Figure 9:
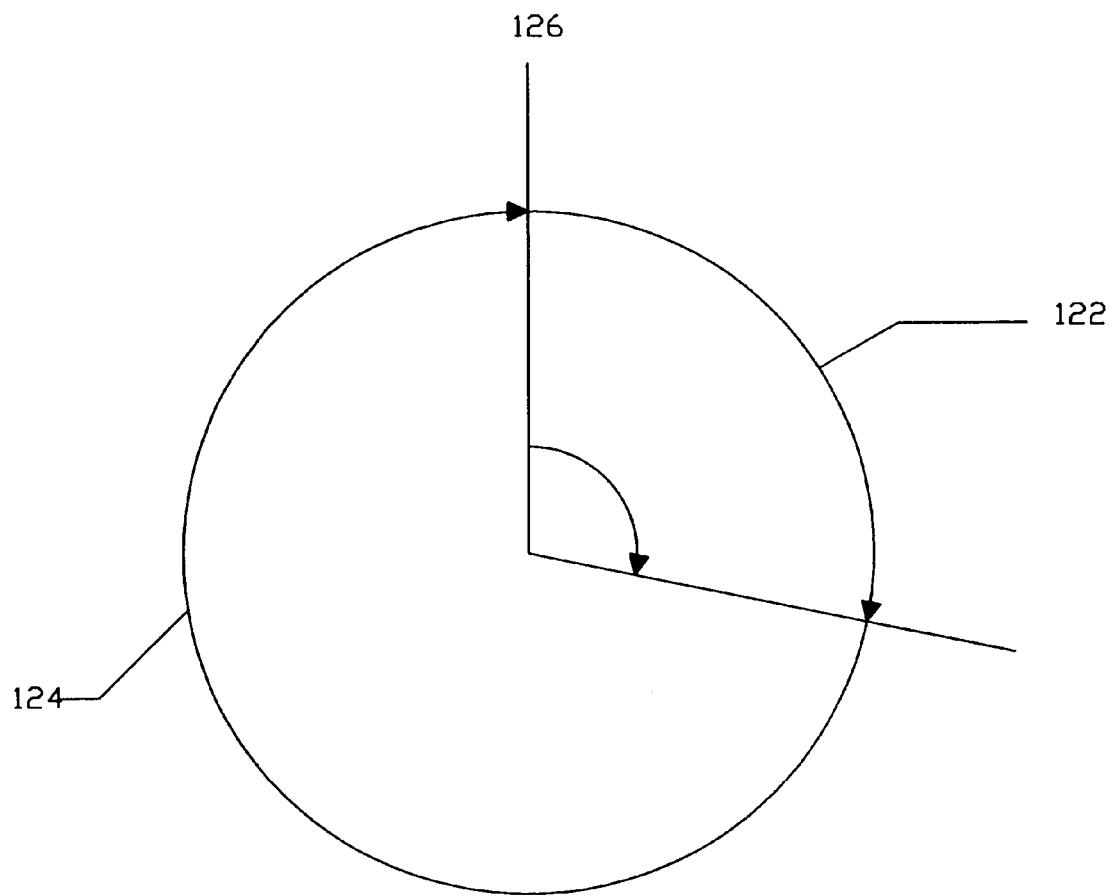
FIG. 9 shows the range of bit rotation azimuthal angle of an embodiment of the present invention.

FIG. 9 shows the range of bit rotation azimuthal angle 122 where the repetition rate or pulse energy is increased to increase excavation on that side of the drill bit, compared to the rest of the bit rotation angle that has reduced pulse repetition rate or pulse energy 124. The bit rotation is referenced to a particular direction relative to the formation 126, often magnetic north, to enable the correct drill hole direction change to be made. This reference is usually achieved by instrumentation provided on the bit. When the pulsed power system provides a high voltage pulse to the electrodes on the side of the bit (See FIG. 6), an arc is struck between one hot electrode and one ground electrode. This arc excavates a certain amount of rock out of the hole. By the time the next high voltage pulse arrives at the electrodes, the bit has rotated a certain amount, and a new arc is struck at a new location in the rock. If the repetition rate of the electrical pulses is constant as a function of bit rotation azimuthal angle, the bit will drill a straight hole. If the repetition rate of the electrical pulses varies as a function of bit rotation azimuthal angle, the bit will tend to drift in the direction of the side of the bit that has the higher repetition rate. The direction of the drilling and the rate of deviation can be controlled by controlling the difference in repetition rate inside the high repetition rate zone azimuthal angle, compared to the repetition rate outside the zone (See FIG. 9). Also, the azimuthal angle of the high repetition rate zone can be varied to control the directional drilling. A variation of the invention is to control the energy per pulse as a function of azimuthal angle instead of, or in addition to, controlling the repetition rate to achieve directional drilling.

Fast Drill System

Another embodiment of the present invention provides a drilling system/assembly utilizing the electrocrushing bits described herein and is designated herein as the FAST Drill system. A limitation in drilling rock with a drag bit is the low cutter velocity at the center of the drill bit. This is where the velocity of the grinding teeth of the drag bit is the lowest and hence the mechanical drilling efficiency is the poorest. Effective removal of rock in the center portion of the hole is the limiting factor for the drilling rate of the drag bit. Thus, an embodiment of the FAST Drill system comprises a small electrocrushing (EC) bit (alternatively referred to herein as a FAST bit or FAST Drill bit) disposed at the center of a drag bit to drill the rock at the center of the hole. Thus, the EC bit removes the rock near the center of the hole and substantially increases the drilling rate. By increasing the drilling rate, the net energy cost to drill a particular hole is substantially reduced. This is best illustrated by the bit shown in FIG. 5 (discussed above) comprising EC process electrodes 108 and 100 set at the center of bit 114, surrounded by mechanical drag-bit teeth 116. The rock at the center of the bit is removed by the EC electrode set, and the rock near the edge of the hole is removed by the mechanical teeth, where the tooth velocity is high and the mechanical efficiency is high.

As noted above, the function of the mechanical drill teeth on the bit is to smooth off the tops of the protrusions and recesses left by the electrocrushing or plasma-hydraulic process. Because the electrocrushing process utilizes an arc through the rock to crush or fracture the rock, the surface of the rock is rough and uneven. The mechanical drill teeth smooth the surface of the rock, cutting off the tops of the protrusions so that the next time the electrocrushing electrodes come around to remove more rock, they have a larger smoother rock surface to contact the electrodes.

The EC bit preferably comprises passages for the drilling fluid to flush out the rock debris (i.e., cuttings) (See FIG. 6). The drilling fluid flows through passages inside the electrocrushing bit and then out] through passages 120 in the surface of the bit near the electrodes and near the drilling teeth, and then flows up the side of the drill system and the well to bring rock cuttings to the surface.

The EC bit may comprise an insulation section that insulates the electrodes from the housing, the electrodes themselves, the housing, the mechanical rock cutting teeth that help smooth the rock surface, and the high voltage connections that connect the high voltage power cable to the bit electrodes.

Figure 10:
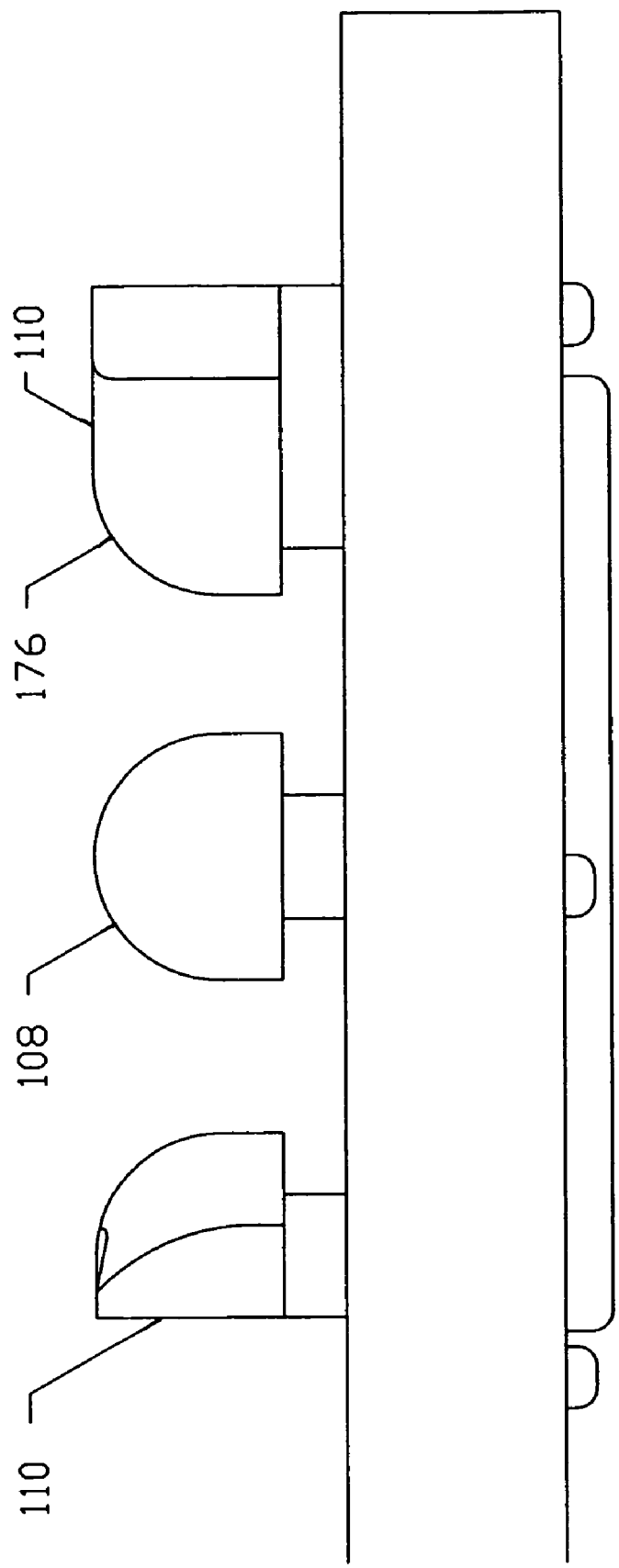
FIG. 10 shows an embodiment of the drill bit of the present invention having radiused electrodes.

FIG. 10 shows an embodiment of the Fast drill high voltage electrode 108 and ground electrodes 110 that incorporate a radius 176 on the electrode, with electrode radius 176 on the rock-facing side of electrodes 110. Radius 176 is an important feature of the present invention to allocate the electric field into the rock. The feature is not obvious because electrodes from prior art were usually sharp to enhance the local electric field.

Figure 11:
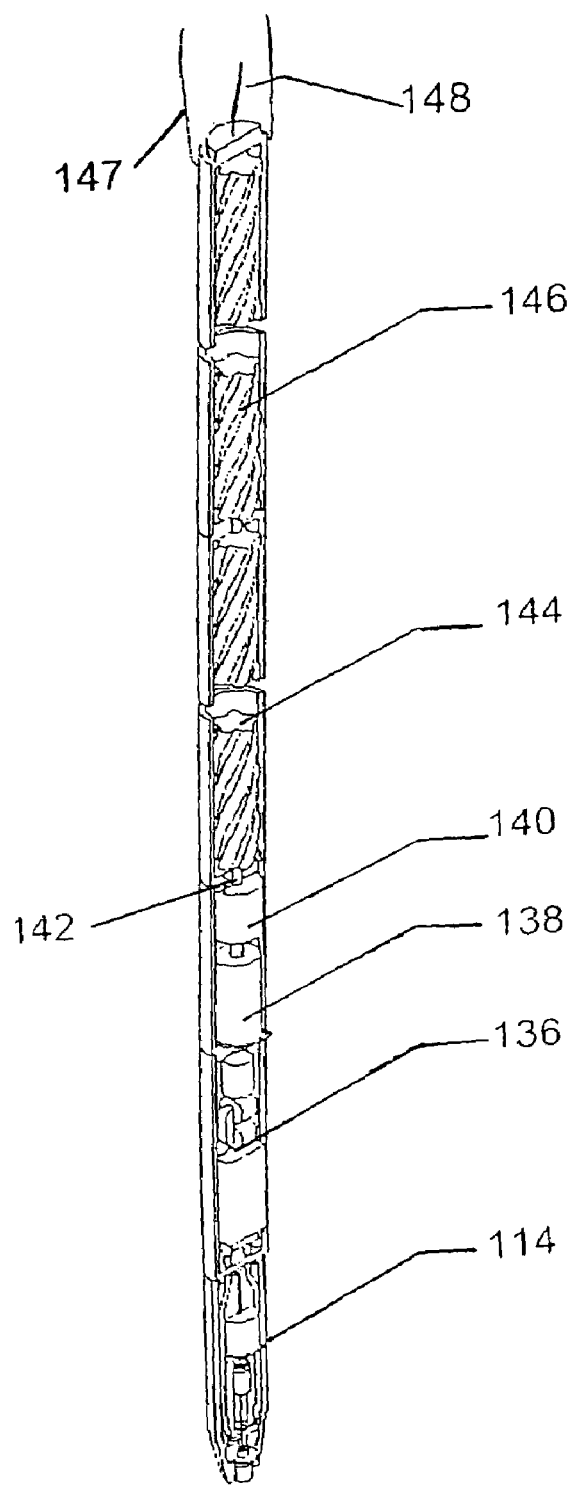
FIG. 11 shows the complete drill assembly of an embodiment of the present invention.

FIG. 11 shows an embodiment of the FAST Drill system comprising two or more sectional components, including, but not limited to: (1) at least one pulsed power FAST drill bit 114; (2) at least one pulsed power supply 136; (3) at least one downhole generator 138; (4) at least one overdrive gear to rotate the downhole generator at high speed 140; (5) at least one downhole generator drive mud motor 144; (6) at least one drill bit mud motor 146; (7) at least one rotating interface 142; (8) at least one tubing or drill pipe for the drilling fluid 147; and (9) at least one cable 148. Not all embodiments of the FAST Drill system utilize all of these components. For example, one embodiment utilizes continuous coiled tubing to provide drilling fluid to the drill bit, with a cable to bring electrical power from the surface to the pulsed power system. That embodiment does not require a down-hole generator, overdrive gear, or generator drive mud motor, but does require a downhole mud motor to rotate the bit, since the tubing does not turn. An electrical rotating interface is required to transmit the electrical power from the non-rotating cable to the rotating drill bit.

An embodiment utilizing a multi-section rigid drill pipe to rotate the bit and conduct drilling fluid to the bit requires a downhole generator, because a power cable cannot be used, but does not need a mud motor to turn the bit, since the pipe turns the bit. Such an embodiment does not need a rotating interface because the system as a whole rotates at the same rotation rate.

An embodiment utilizing a continuous coiled tubing to provide mud to the drill bit, without a power cable, requires a down-hole generator, overdrive gear, and a generator drive mud motor, and also needs a downhole motor to rotate the bit because the tubing does not turn. An electrical rotating interface is needed to transmit the electrical control and data signals from the non-rotating cable to the rotating drill bit.

An embodiment utilizing a continuous coiled tubing to provide drilling fluid to the drill bit, with a cable to bring high voltage electrical pulses from the surface to the bit, through the rotating interface, places the source of electrical power and the pulsed power system at the surface. This embodiment does not need a down-hole generator, overdrive gear, or generator drive mud motor or downhole pulsed power systems, but does need a downhole motor to rotate the bit, since the tubing does not turn.

Still another embodiment utilizes continuous coiled tubing to provide drilling fluid to the drill bit, with a fuel cell to generate electrical power located in the rotating section of the drill string. Power is fed across the rotating interface to the pulsed power system, where the high voltage pulses are created and fed to the FAST bit. Fuel for the fuel cell is fed down tubing inside the coiled tubing mud pipe.

An embodiment of the FAST Drill system comprises FAST bit 114, a drag bit reamer 150 (shown in FIG. 12), and a pulsed power system housing 136 (FIG. 11).

Figure 12:
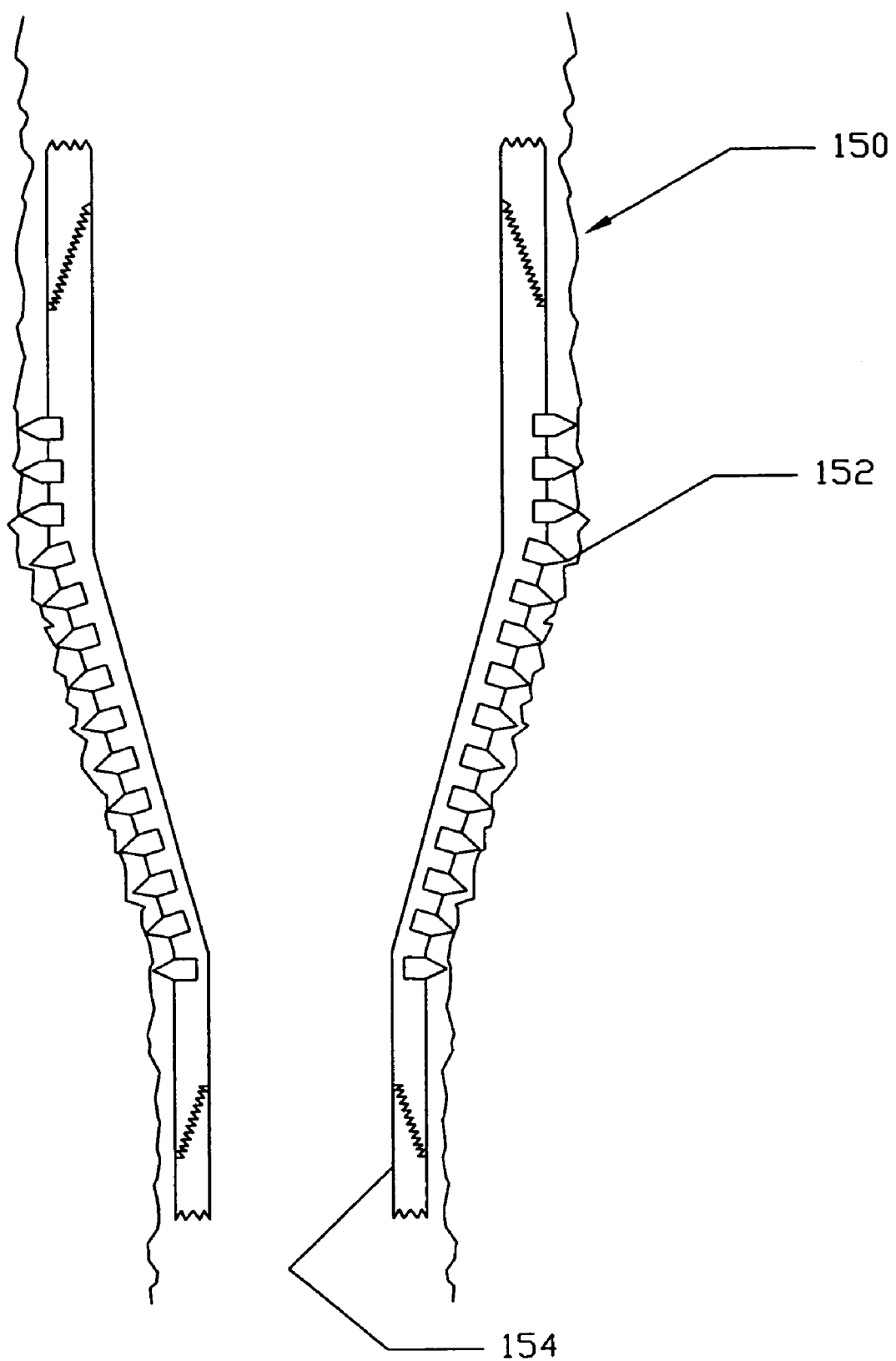
FIG. 12 shows the reamer drag bit of an embodiment of the present invention.

FIG. 12 shows reamer drag bit 150 that enlarges the hole cut by the electrocrushing FAST bit, drag bit teeth 152, and FAST bit attachment site 154. Reamer drag bit 150 is preferably disposed just above FAST bit 114. This is a conical pipe section, studded with drill teeth, that is used to enlarge the hole drilled by the EC bit (typically, for example, approximately 7.5 inches in diameter) to the full diameter of the well (for example, to approximately 12.0 inches in diameter). The conical shape of drag bit reamer 150 provides more cutting teeth for a given diameter of hole, thus higher drilling rates. Disposed in the center part of the reamer section are several passages. There is a passage for the power cable to go through to the FAST bit. The power cable comes from the pulsed power section located above and/or within the reamer and connects to the FAST drill bit below the reamer. There are also passages in the reamer that provide oil flow down to the FAST bit and passages that provide flushing fluid to the reamer teeth to help cut the rock and flush the cuttings from the reamer teeth.

Figure 13:
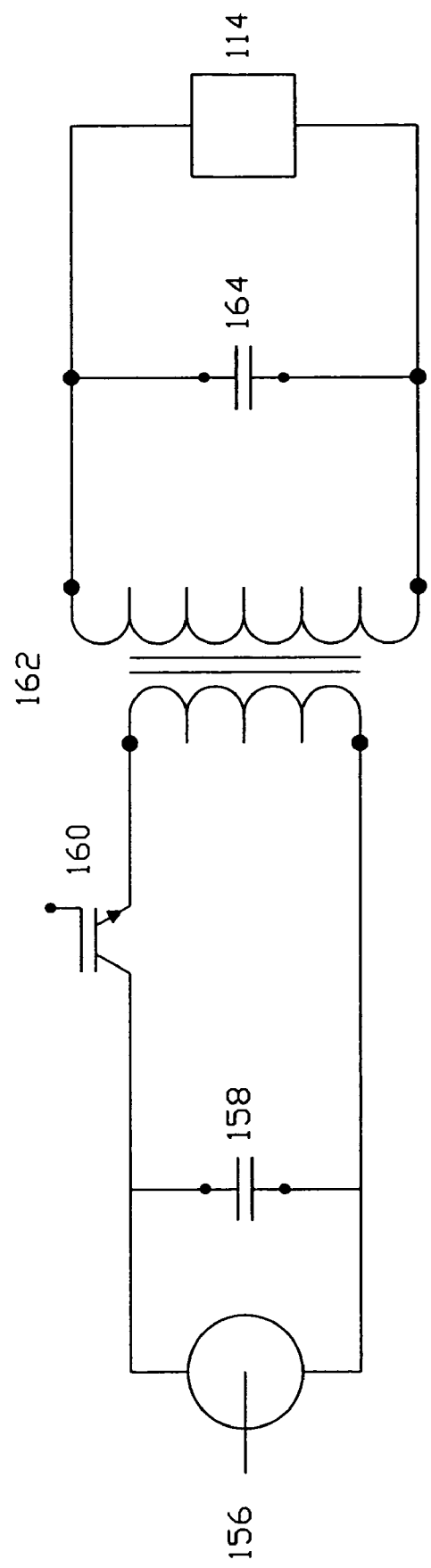
FIG. 13 shows a solid-state switch or gas switch controlled high voltage pulse generating system that pulse charges the primary output capacitor of an embodiment of the present invention.
Figure 14:
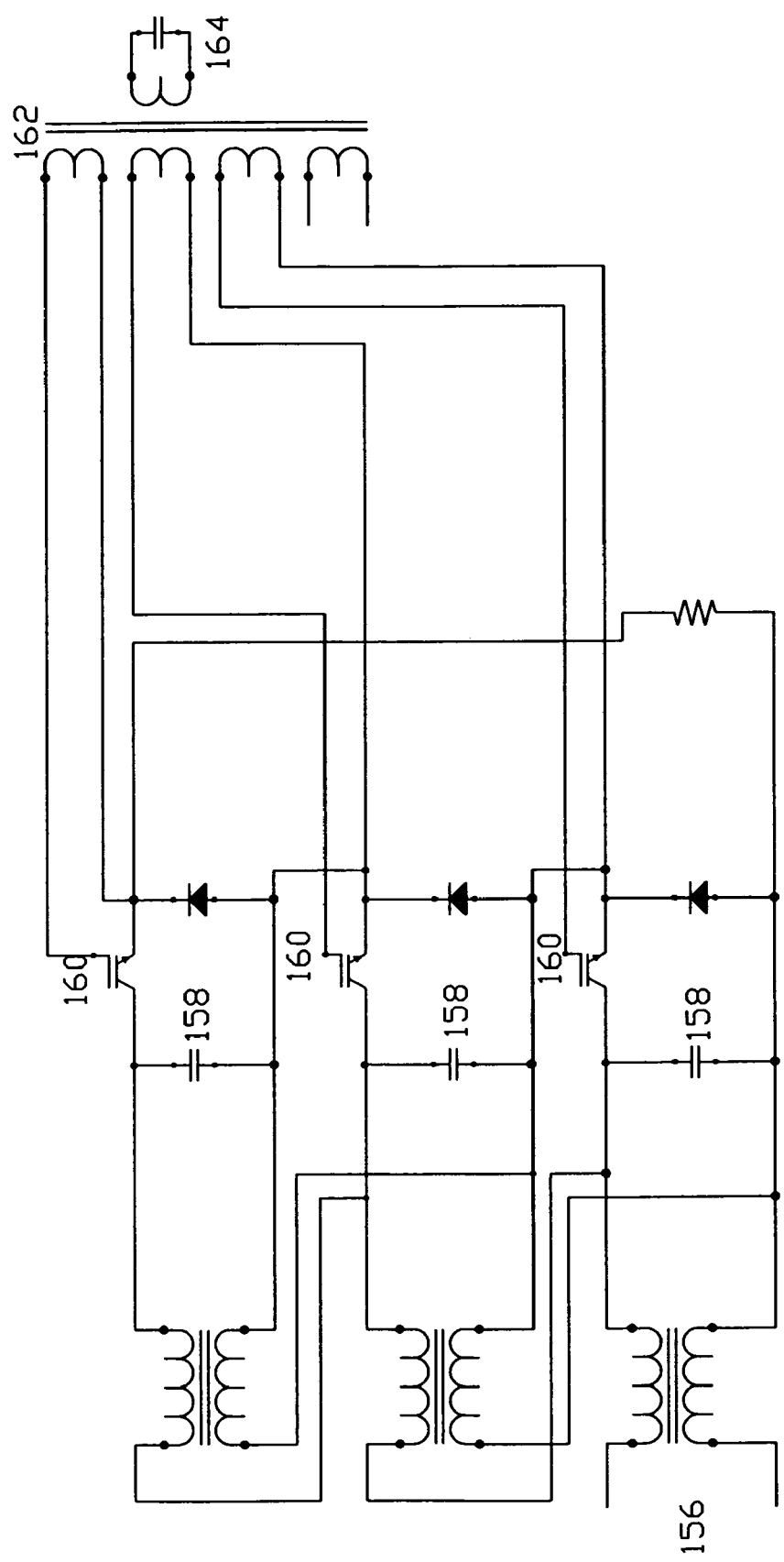
FIG. 14 shows an array of solid-state switch or gas switch controlled high voltage pulse generating circuits that are charged in parallel and discharged in series to pulse-charge the output capacitor of an embodiment of the present invention.
Figure 15:
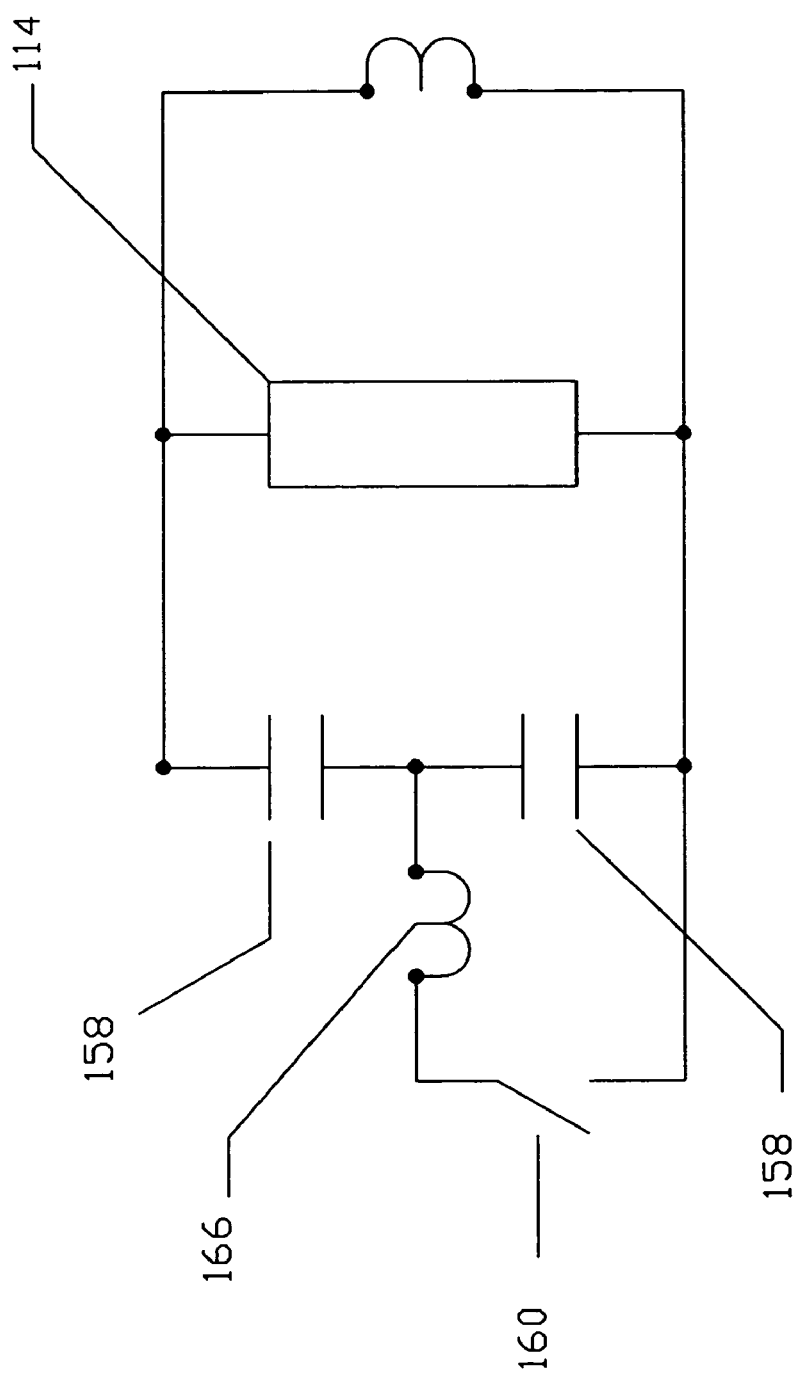
FIG. 15 shows a voltage vector inversion circuit that produces a pulse that is a multiple of the charge voltage of an embodiment of the present invention.

Preferably, a pulse power system that powers the FAST bit is enclosed in the housing of the reamer drag bit and the stem above the drag bit as shown in FIG. 11. This system takes the electrical power supplied to the FAST Drill for the electrocrushing FAST bit and transforms that power into repetitive high voltage pulses, usually over 100 kV. The repetition rate of those pulses is controlled by the control system from the surface or in the bit housing. The pulsed power system itself can include, but is not limited to:

(1) a solid state switch controlled or gas-switch controlled pulse generating system with a pulse transformer that pulse charges the primary output capacitor (example shown in FIG. 13);

(2) an array of solid-state switch or gas-switch controlled circuits that are charged in parallel and in series pulse-charge the output capacitor (example shown in FIG. 14);

(3) a voltage vector inversion circuit that produces a pulse at about twice, or a multiple of, the charge voltage (example shown in FIG. 15);

(4) An inductive store system that stores current in an inductor, then switches it to the electrodes via an opening or transfer switch (example shown in FIG. 16); or (5) any other pulse generation circuit that provides repetitive high voltage, high current pulses to the FAST Drill bit.

FIG. 13 shows a solid-state switch or gas switch controlled high voltage pulse generating system that pulse charges the primary output capacitor 164, showing generating means 156 to provide DC electrical power for the circuit, intermediate capacitor electrical energy storage means 158, gas, solid-state, or vacuum switching means 160 to switch the stored electrical energy into pulse transformer 162 voltage conversion means that charges output capacitive storage means 164 connecting to FAST bit 114.

FIG. 14 shows an array of solid-state switch or gas switch 160 controlled high voltage pulse generating circuits that are charged in parallel and discharged in series through pulse transformer 162 to pulse-charge output capacitor 164.

FIG. 15 shows a voltage vector inversion circuit that produces a pulse that is a multiple of the charge voltage. An alternate of the vector inversion circuit that produces an output voltage of about twice the input voltage is shown, showing solid-state switch or gas switching means 160, vector inversion inductor 166, intermediate capacitor electrical energy storage means 158 connecting to FAST bit 114.

Figure 16:
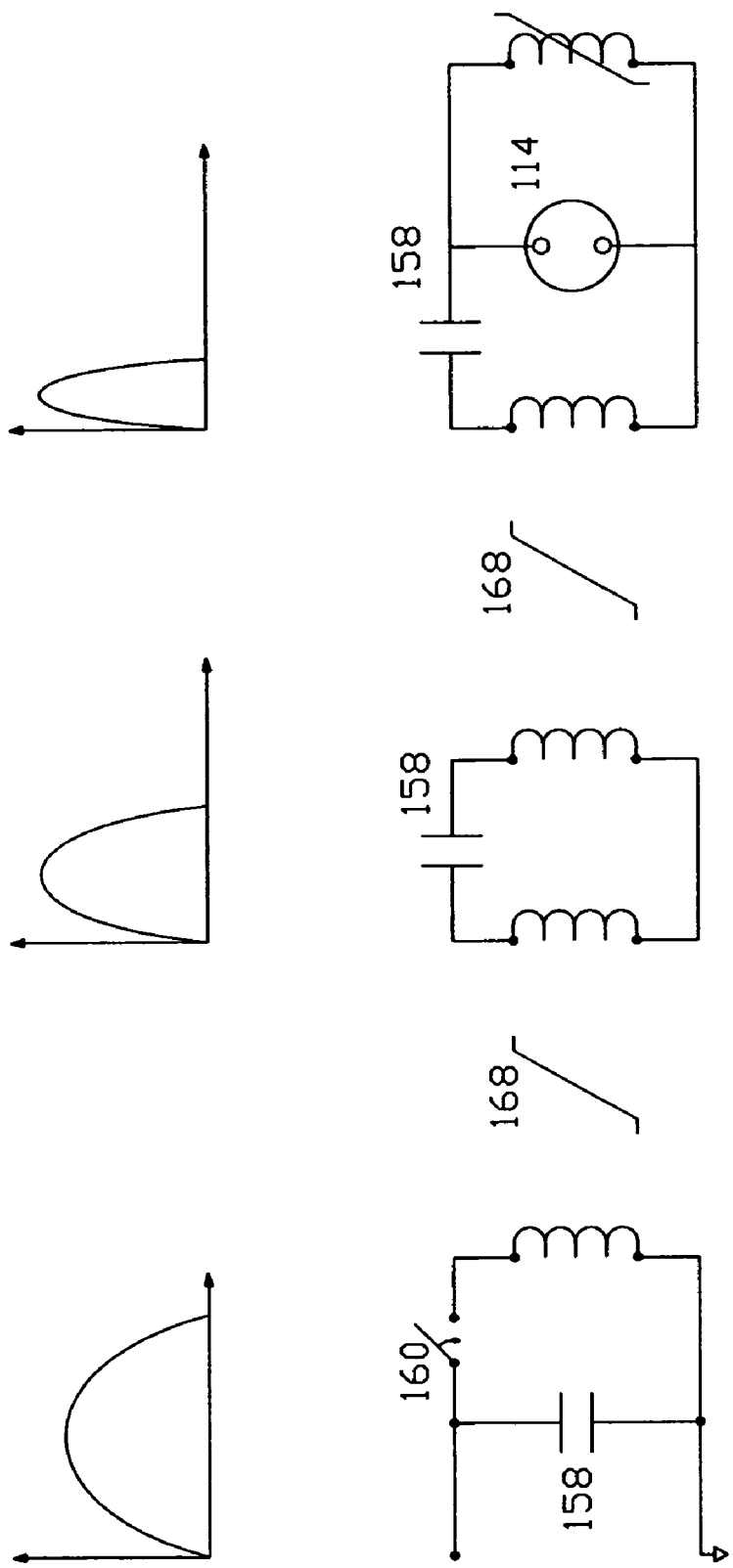
FIG. 16 shows an inductive store voltage gain system to produce the pulses needed for the FAST Drill of an embodiment of the present invention.

FIG. 16 shows an inductive store voltage gain system to produce the pulses needed for the FAST Drill, showing the solid-state switch or gas switching means 160, saturable pulse transformers 168, and intermediate capacitor electrical energy storage means 158 connecting to the FAST bit 114.

The pulsed power system is preferably located in the rotating bit, but may be located in the stationary portion of the drill pipe or at the surface.

Electrical power for the pulsed power system is either generated by a generator at the surface, or drawn from the power grid at the surface, or generated down hole. Surface power is transmitted to the FAST drill bit pulsed power system either by cable inside the drill pipe or conduction wires in the drilling fluid pipe wall. In the preferred embodiment, the electrical power is generated at the surface, and transmitted downhole over a cable 148 located inside the continuous drill pipe 147 (shown in FIG. 11).

The cable is located in non-rotating flexible mud pipe (continuous coiled tubing). Using a cable to transmit power to the bit from the surface has advantages in that part of the power conditioning can be accomplished at the surface, but has a disadvantage in the weight, length, and power loss of the long cable.

At the bottom end of the mud pipe is located the mud motor which utilizes the flow of drilling fluid down the mud pipe to rotate the FAST Drill bit and reamer assembly. Above the pulsed power section, at the connection between the mud pipe and the pulsed power housing, is the rotating interface as shown in FIG. 11. The cable power is transmitted across an electrical rotating interface at the point where the mud motor turns the drag bit. This is the point where relative rotation between the mud pipe and the pulsed power housing is accommodated. The rotating electrical interface is used to transfer the electrical power from the cable or continuous tubing conduction wires to the pulsed power system. It also passes the drilling fluid from the non-rotating part to the rotating part of the drill string to flush the cuttings from the EC electrodes and the mechanical teeth. The pulsed power system is located inside the rigid drill pipe between the rotating interface and the reamer. High voltage pulses are transmitted inside the reamer to the FAST bit.

In the case of electrical power transmission through conduction wires in rigid rotating pipe, the rotating interface is not needed because the pulsed power system and the conduction wires are rotating at the same velocity. If a downhole gearbox is used to provide a different rotation rate for the pulsed power/bit section from the pipe, then a rotating interface is needed to accommodate the electrical power transfer.

In another embodiment, power for the FAST Drill bit is provided by a downhole generator that is powered by a mud motor that is powered by the flow of the drilling fluid (mud) down the drilling fluid, rigid, multi-section, drilling pipe (FIG. 11). That mudflow can be converted to rotational mechanical power by a mud motor, a mud turbine, or similar mechanical device for converting fluid flow to mechanical power. Bit rotation is accomplished by rotating the rigid drill pipe. With power generation via downhole generator, the output from the generator can be inside the rotating pulsed power housing so that no rotating electrical interface is required (FIG. 11), and only a mechanical interface is needed. The power comes from the generator to the pulsed power system where it is conditioned to provide the high voltage pulses for operation of the FAST bit.

Alternatively, the downhole generator might be of the piezoelectric type that provides electrical power from pulsation in the mud. Such fluid pulsation often results from the action of a mud motor turning the main bit.

Figure 17:
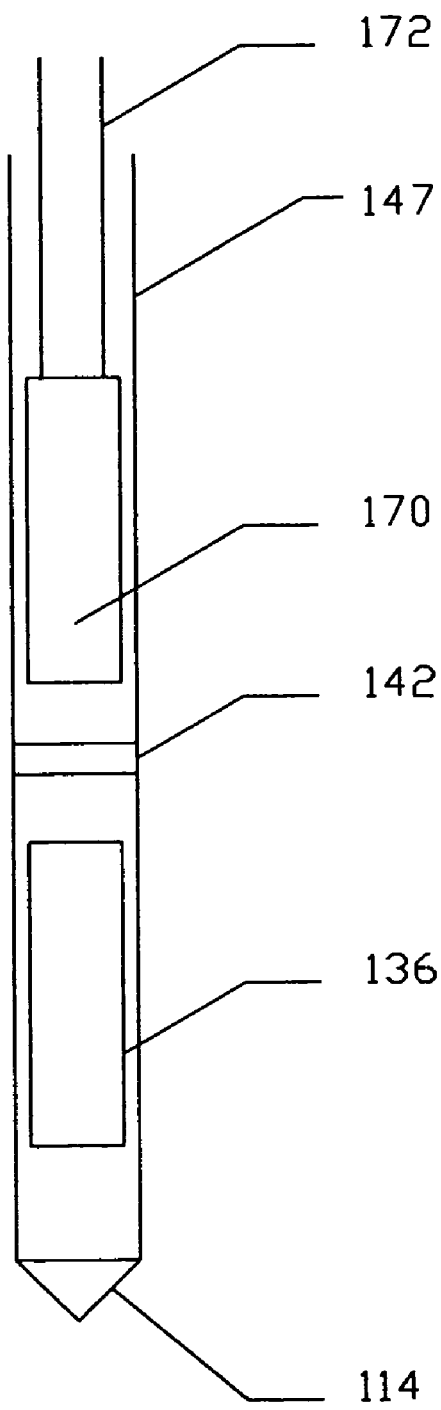
FIG. 17 shows a drill assembly powered by a fuel cell that is supplied by fuel lines and exhaust line from the surface inside the continuous metal mud pipe of an embodiment of the present invention.

Another embodiment for power generation is to utilize a fuel cell in the non-rotating section of the drill string. FIG. 17 shows an example of a FAST Drill system powered by fuel cell 170 that is supplied by fuel lines and exhaust line 172 from the surface inside the continuous metal mud pipe 147. The power from fuel cell 170 is transmitted across the rotating interface 142 to pulsed power system 136, and hence to FAST bit 114. The fuel cell consumes fuel to produce electricity. Fuel lines are placed inside the continuous coiled tubing, which provides drilling fluid to the drill bit, to provide fuel to the fuel cell, and to exhaust waste gases. Power is fed across the rotating interface to the pulsed power system, where the high voltage pulses are created and fed to the FAST bit.

As noted above, there are two primary means for transmitting drilling fluid (mud) from the surface to the bit: continuous flexible tubing or rigid multi-section drill pipe. The continuous flexible mud tubing is used to transmit mud from the surface to the rotation assembly where part of the mud stream is utilized to spin the assembly through a mud motor, a mud turbine, or another rotation device. Part of the mudflow is transmitted to the FAST bits and reamer for flushing the cuttings up the hole. Continuous flexible mud tubing has the advantage that power and instrumentation cables can be installed inside the tubing with the mudflow. It is stationary and not used to transmit torque to the rotating bit. Rigid multi-section drilling pipe comes in sections and cannot be used to house continuous power cable, but can transmit torque to the bit assembly. With continuous flexible mud pipe, a mechanical device such as, for example, a mud motor, or a mud turbine, is used to convert the mud flow into mechanical rotation for turning the rotating assembly. The mud turbine can utilize a gearbox to reduce the revolutions per minute. A downhole electric motor can alternatively be used for turning the rotating assembly. The purpose of the rotating power source is primarily to provide torque to turn the teeth on the reamer and the FAST bit for drilling. It also rotates the FAST bit to provide the directional control in the cutting of a hole. Another embodiment is to utilize continuous mud tubing with downhole electric power generation.

In one embodiment, two mud motors or mud turbines are used: one to rotate the bits, and one to generate electrical power.

Another embodiment of the rigid multi-section mud pipe is the use of data transmitting wires buried in the pipe such as, for example, the Intelipipe manufactured by Grant Prideco. This is a composite pipe that uses magnetic induction to transmit data across the pipe joints, while transmitting it along wires buried in the shank of the pipe sections. Utilizing this pipe provides for data transmission between the bit and the control system on the surface, but still requires the use of downhole power generation.

Figure 18:
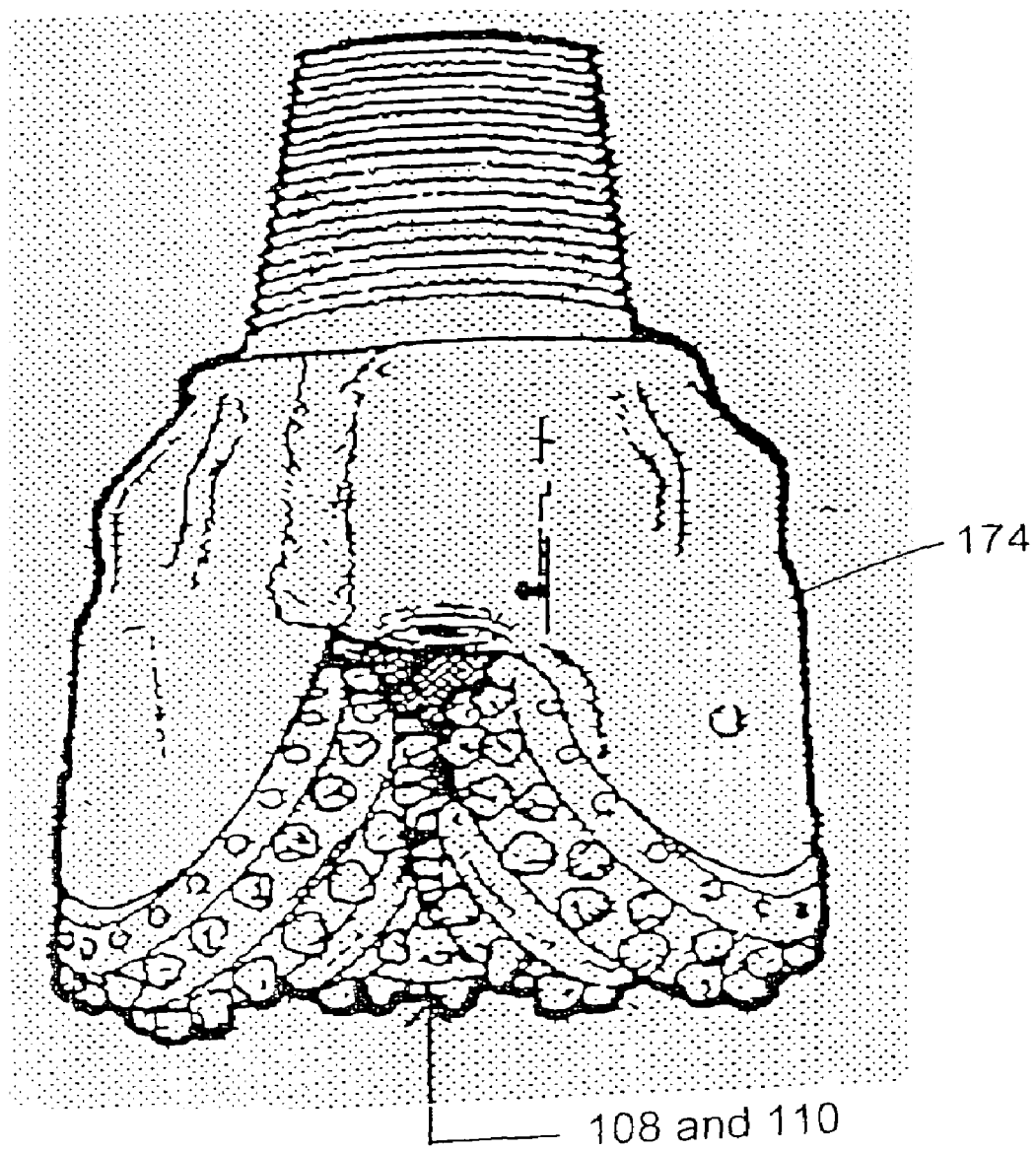
FIG. 18 shows a roller-cone bit with an electrode set of an embodiment of the present invention.

Another embodiment of the FAST Drill is shown in FIG. 18 wherein rotary or roller-cone bit 174 is utilized, instead of a drag bit, to enlarge the hole drilled by the FAST bit. Roller-cone bit 174 comprises electrodes 108 and 110 disposed in or near the center portion of roller cone bit 174 to excavate that portion of the rock where the efficiency of the roller bit is the least.

Another embodiment of the rotating interface is to use a rotating magnetic interface to transfer electrical power and data across the rotating interface, instead of a slip ring rotating interface.

In another embodiment, the mud returning from the well loaded with cuttings flows to a settling pond, at the surface, where the rock fragments settle out. The mud then cleaned and reinjected into the FAST Drill mud pipe.

Electrocrushing Vein Miner

Figure 19:
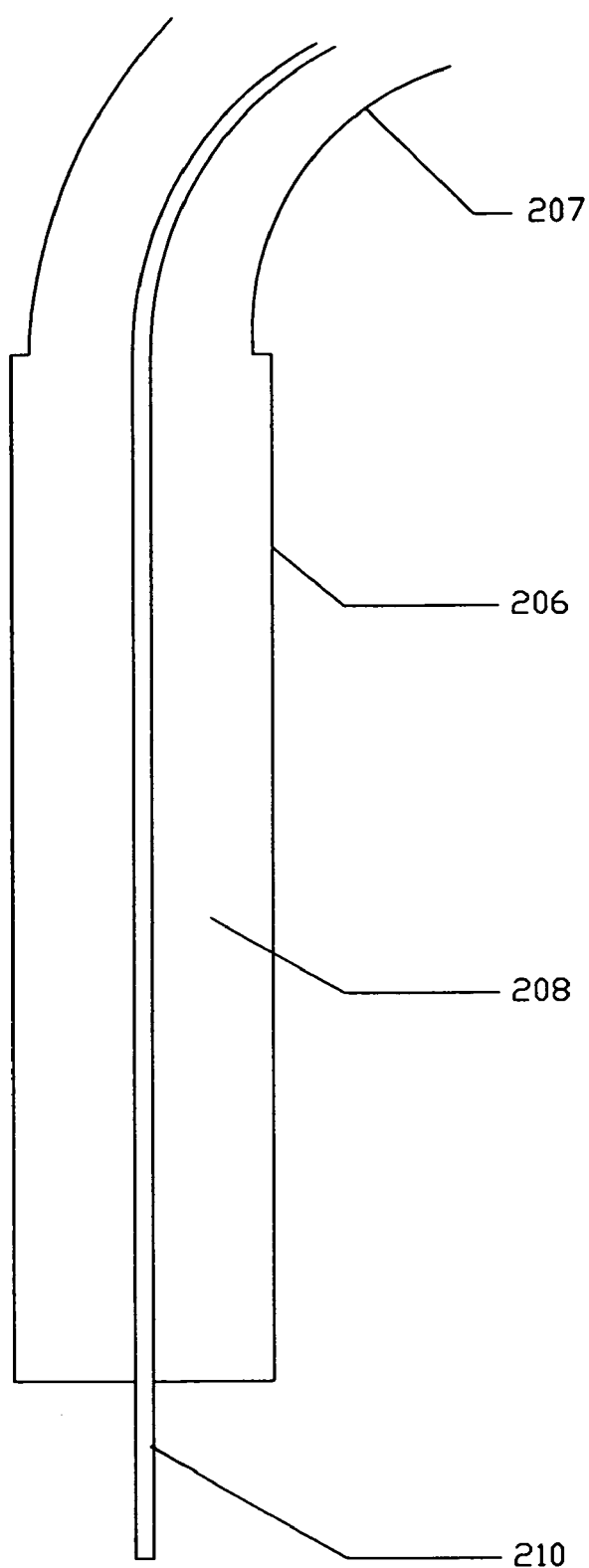
FIG. 19 shows a small-diameter electrocrushing drill of an embodiment of the present invention.

Another embodiment of the present invention provides a small-diameter, electrocrushing drill (designated herein as "SED") that is related to the hand-held electrohydraulic drill disclosed in U.S. Pat. No. 5,896,938 (to a primary inventor herein), incorporated herein by reference. However, the SED is distinguishable in that the electrodes in the SED are spaced in such a way, and the rate of rise of the electric field is such, that the rock breaks down before the water breaks down. When the drill is near rock, the electric fields break down the rock and current passes through the rock, thus fracturing the rock into small pieces. The electrocrushing rock fragmentation occurs as a result of tensile failure caused by the electrical current passing through the rock, as opposed to compressive failure caused by the electrohydraulic (EH) shock or pressure wave on the rock disclosed in U.S. Pat. No. 5,896,938, although the SED, too, can be connected via a cable from a box as described in the '938 patent so that it can be portable. FIG. 19 shows a SED drill bit comprising case 206, internal insulator 208, and center electrode 210 which is preferably movable (e.g., spring-loaded) to maintain contact with the rock while drilling. Although case 206 and internal insulator 208 are shown as providing an enclosure for center electrode 210, other components capable of providing an enclosure may be utilized to house electrode 210 or any other electrode incorporated in the SED drill bit. Preferably, case 206 of the SED is the ground electrode, although a separate ground electrode may be provided. Also, it should be understood that more than one set of electrodes may be utilized in the SED bit. A pulsed power generator as described in other embodiments herein is linked to said drill bit for delivering high voltage pulses to the electrode. In an embodiment of the SED, cable 207 (which may be flexible) is provided to link a generator to the electrode(s). A passage, for example cable 207, is preferably used to deliver water down the SED drill.

This SED embodiment is advantageous for drilling in non-porous rock. Also, this embodiment benefits from the use concurrent use of the high permittivity liquid discussed herein.

Figure 20:
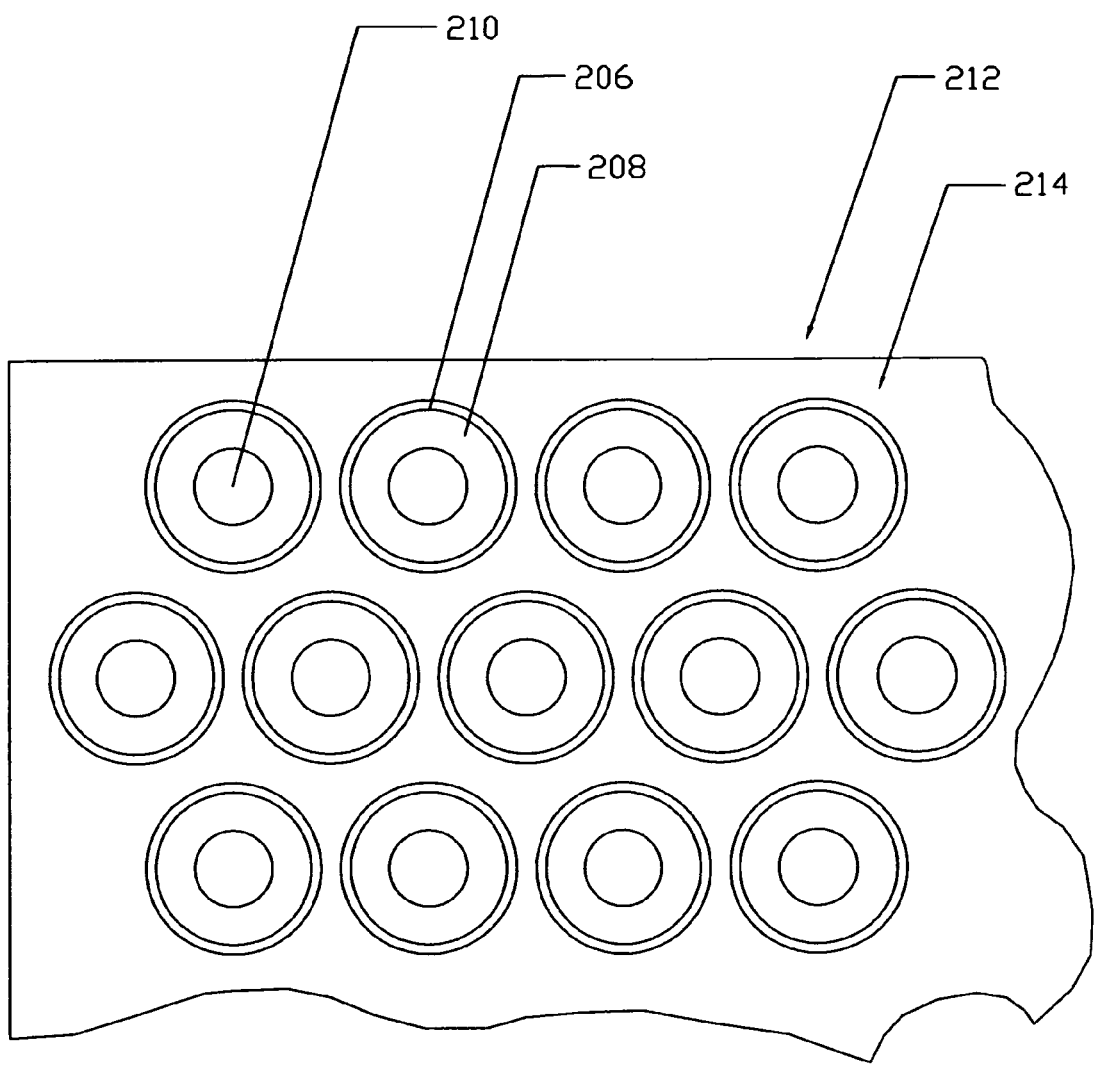
FIG. 20 shows an electrocrushing vein miner of an embodiment of the present invention.

Another embodiment of the present invention is to assemble several individual SED drill heads or electrode sets together into an array or group of drills, without the individual drill housings, to provide the capability to mine large areas of rock. In such an embodiment, a vein of ore can be mined, leaving most of the waste rock behind. FIG. 20 shows such an embodiment of a mineral vein mining machine herein designated Electrocrushing Vein Miner (EVM) 212 comprising a plurality of SED drills 214, SED case 206, SED insulator 208, and SED center electrode 210. This assembly can then be steered as it moves through the rock by varying the repetition rate of the high voltage pulses differentially among the drill heads. For example, if the repetition rate for the top row of drill heads is twice as high but contains the same energy per pulse as the repetition rate for the lower two rows of drill heads, the path of the mining machine will curve in the direction of the upper row of drill heads, because the rate of rock excavation will be higher on that side. Thus, by varying the repetition rate and/or pulse energy of the drill heads, the EVM can be steered dynamically as it is excavating a vein of ore. This provides a very useful tool for efficiently mining just the ore from a vein that has substantial deviation in direction.

In another embodiment, a combination of electrocrushing and electrohydraulic (EH) drill bit heads enhances the functionality of the EVM by enabling the EVM to take advantage of ore structures that are layered. Where the machine is mining parallel to the layers, as is the case in mining most veins of ore, the shock waves from the EH drill bit heads tend to separate the layers, thus synergistically coupling to the excavation created by the EC electrodes. In addition, combining electrocrushing drill heads with plasma-hydraulic drill heads combines the compressive rock fracturing capability of the plasma-hydraulic drill heads with the tensile rock failure of the EC drill heads to more efficiently excavate rock.

With the EVM mining machine, ore can be mined directly and immediately transported to a mill by water transport, already crushed, so the energy cost of primary crushing and the capital cost of the primary crushers is saved. This method has a great advantage over conventional mechanical methods in that it combines several steps in ore processing, and it greatly reduces the amount of waste rock that must be processed. This method of this embodiment can also be used for tunneling.

The high voltage pulses can be generated in the housing of the EVM, transmitted to the EVM via cables, or both generated elsewhere and transmitted to the housing for further conditioning. The electrical power generation can be at the EVM via fuel cell or generator, or transmitted to the EVM via power cable. Typically, water or mining fluid flows through the structure of the EVM to flush out rock cuttings.

If a few, preferably just three, of the EC or PH drill heads shown in FIG. 20 are placed in a housing, the assembly can be used to drill holes, with directional control by varying the relative repetition rate of the pulses driving the drill heads. The drill will tend to drift in the direction of the drill head with the highest pulse repletion rate, highest pulse energy, or highest average power. This electrocrushing (or EH) drill can create very straight holes over a long distance for improving the efficiency of blasting in underground mining, or it can be used to place explosive charges in areas not accessible in a straight line.

Insulating Drilling Fluid

An embodiment of the present invention also comprises insulating drilling fluids that may be utilized in the drilling methods described herein. For example, for the electrocrushing process to be effective in rock fracturing or crushing, it is preferable that the dielectric constant of the insulating fluid be greater than the dielectric constant of the rock and that the fluid have low conductivity such as, for example, a conductivity of less than approximately $10^{-6}$ mho/cm and a dielectric constant of at least approximately 6.

Therefore, one embodiment of the present invention provides for an insulating fluid or material formulation of high permittivity, or dielectric constant, and high dielectric strength with low conductivity. The insulating formulation comprises two or more materials such that one material provides a high dielectric strength and another provides a high dielectric constant. The overall dielectric constant of the insulating formulation is a function of the ratio of the concentrations of the at least two materials. The insulating formulation is particularly applicable for use in pulsed power applications.

Thus, this embodiment of the present invention provides for an electrical insulating formulation that comprises a mixture of two or more different materials. In one embodiment, the formulation comprises a mixture of two carbon-based materials. The first material preferably comprises a dielectric constant of greater than approximately 2.6, and the second material preferably comprises a dielectric constant greater than approximately 10.0. The materials are at least partly miscible with one another, and the formulation preferably has low electrical conductivity. The term "low conductivity" or "low electrical conductivity", as used throughout the specification and claims means a conductivity less than that of tap water, preferably lower than approximately $10^{-5}$ mho/cm, more preferably lower than $10^{-6}$ mho/cm. Preferably, the materials are substantially non-aqueous. The materials in the insulating formulation are preferably non-hazardous to the environment, preferably non-toxic, and preferably biodegradable. The formulation exhibits a low conductivity.

In one embodiment, the first material preferably comprises one or more natural or synthetic oils. Preferably, the first material comprises castor oil, but may comprise or include other oils such as, for example, jojoba oil or mineral oil.

Castor oil (glyceryl triricinoleate), a triglyceride of fatty acids, is obtained from the seed of the castor plant. It is nontoxic and biodegradable. A transformer grade castor oil (from CasChem, Inc.) has a dielectric constant (i.e., relative permittivity) of approximately 4.45 at a temperature of approximately 22° C. (100 Hz).

The second material comprises a solvent, preferably one or more carbonates, and more preferably one or more alkylene carbonates such as, but not limited to, ethylene carbonate, propylene carbonate, or butylene carbonate. The alkylene carbonates can be manufactured, for example, from the reaction of ethylene oxide, propylene oxide, or butylene oxide or similar oxides with carbon dioxide.

Other oils, such as vegetable oil, or other additives can be added to the formulation to modify the properties of the formulation. Solid additives can be added to enhance the dielectric or fluid properties of the formulation.

The concentration of the first material in the insulating formulation ranges from between approximately 1.0 and 99.0 percent by volume, preferably from between approximately 40.0 and 95.0 percent by volume, more preferably still from between approximately 65.0 and 90.0 percent by volume, and most preferably from between approximately 75.0 and 85.0 percent by volume.

The concentration of the second material in the insulating formulation ranges from between approximately 1.0 and 99.0 percent by volume, preferably from between approximately 5.0 and 60.0 percent by volume, more preferably still from between approximately 10.0 and 35.0 percent by volume, and most preferably from between approximately 15.0 and 25.0 percent by volume.

Thus, the resulting formulation comprises a dielectric constant that is a function of the ratio of the concentrations of the constituent materials. The preferred mixture for the formulation of the present invention is a combination of butylene carbonate and a high permittivity castor oil wherein butylene carbonate is present in a concentration of approximately 20% by volume. This combination provides a high relative permittivity of approximately 15 while maintaining good insulation characteristics. In this ratio, separation of the constituent materials is minimized. At a ratio of below 32%, the castor oil and butylene carbonate mix very well and remain mixed at room temperature. At a butylene carbonate concentration of above 32%, the fluids separate if undisturbed for approximately 10 hours or more at room temperature. A property of the present invention is its ability to absorb water without apparent effect on the dielectric performance of the insulating formulation.

An embodiment of the present invention comprising butylene carbonate in castor oil comprises a dielectric strength of at least approximately 300 kV/cm (1 μsec), a dielectric constant of approximately at least 6, a conductivity of less than approximately $10^{-5}$ mho/cm, and a water absorption of up to 2,000 ppm with no apparent negative effect caused by such absorption. More preferably, the conductivity is less than approximately $10^{-6}$ mho/cm.

The formulation of the present invention is applicable to a number of pulsed power machine technologies. For example, the formulation is useable as an insulating and drilling fluid for drilling holes in rock or other hard materials or for crushing such materials as provided for herein. The use of the formulation enables the management of the electric fields for electrocrushing rock. Thus, the present invention also comprises a method of disposing the insulating formulation about a drilling environment to provide electrical insulation during drilling.

Other formulations may be utilized to perform the drilling operations described herein. For example, in another embodiment, crude oil with the correct high relative permittivity derived as a product stream from an oil refinery may be utilized. A component of vacuum gas crude oil has high molecular weight polar compounds with O and N functionality. Developments in chromatography allow such oils to be fractionated by polarity. These are usually cracked to produce straight hydrocarbons, but they may be extracted from the refinery stream to provide high permittivity oil for drilling fluid.

Figure 21:
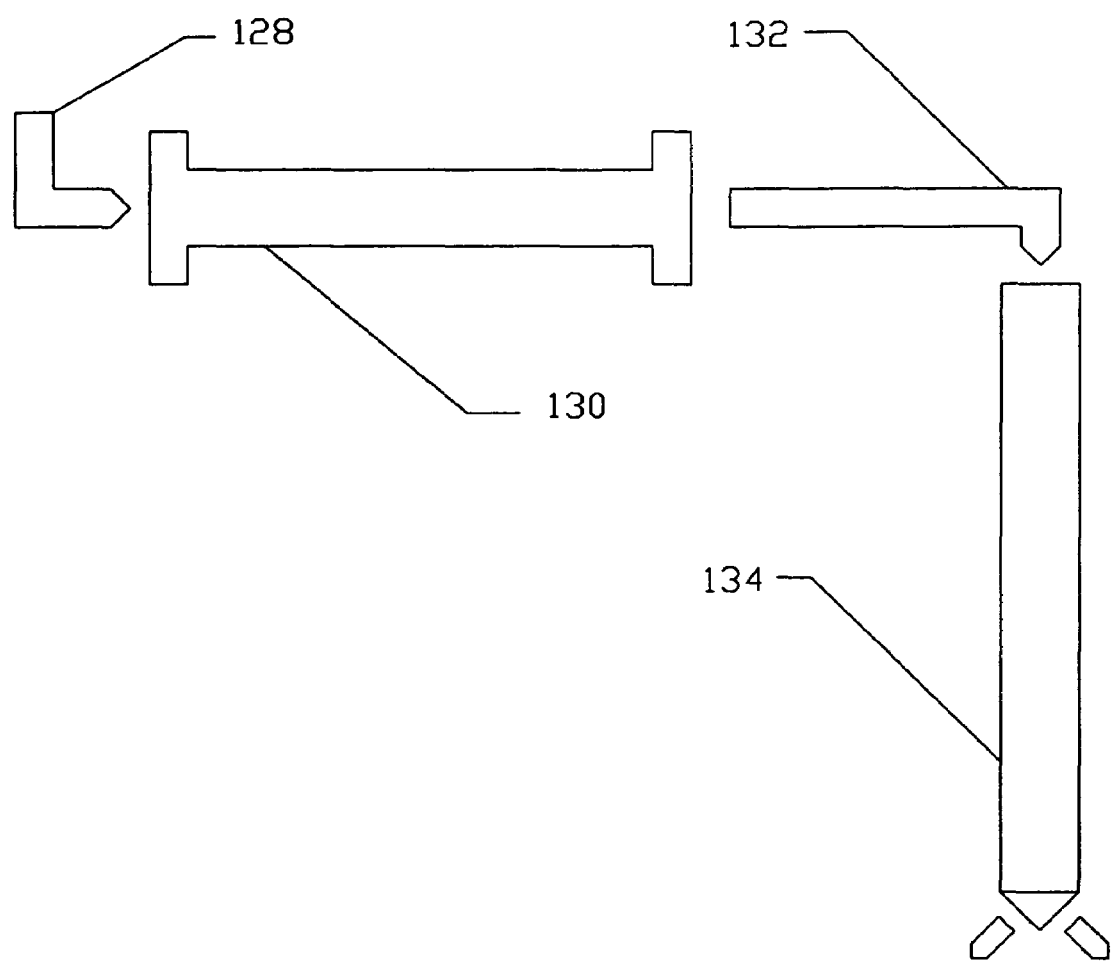
FIG. 21 shows a water treatment unit useable in the embodiments of the present invention.

Another embodiment comprises using specially treated waters. Such waters include, for example, the Energy Systems Plus (ESP) technology of Complete Water Systems which is used for treating water to grow crops. In accordance with this embodiment, FIG. 21 shows water or a water-based mixture 128 entering a water treatment unit 130 that treats the water to significantly reduce the conductivity of the water. The treated water 132 then is used as the drilling fluid by the FAST Drill system 134. The ESP process treats water to reduce the conductivity of the water to reduce the leakage current, while retaining the high permittivity of the water.

High Efficiency Electrohydraulic Boulder Breaker

Another embodiment of the present invention provides a high efficiency electrohydraulic boulder breaker (designated herein as "HEEB") for breaking up medium to large boulders into small pieces. This embodiment prevents the hazard of fly rock and damage to surrounding equipment. The HEEB is related to the High Efficiency Electrohydraulic Pressure Wave Projector disclosed in U.S. Pat. No. 6,215,734 (to the principal inventor herein), incorporated herein by reference.

Figure 22:
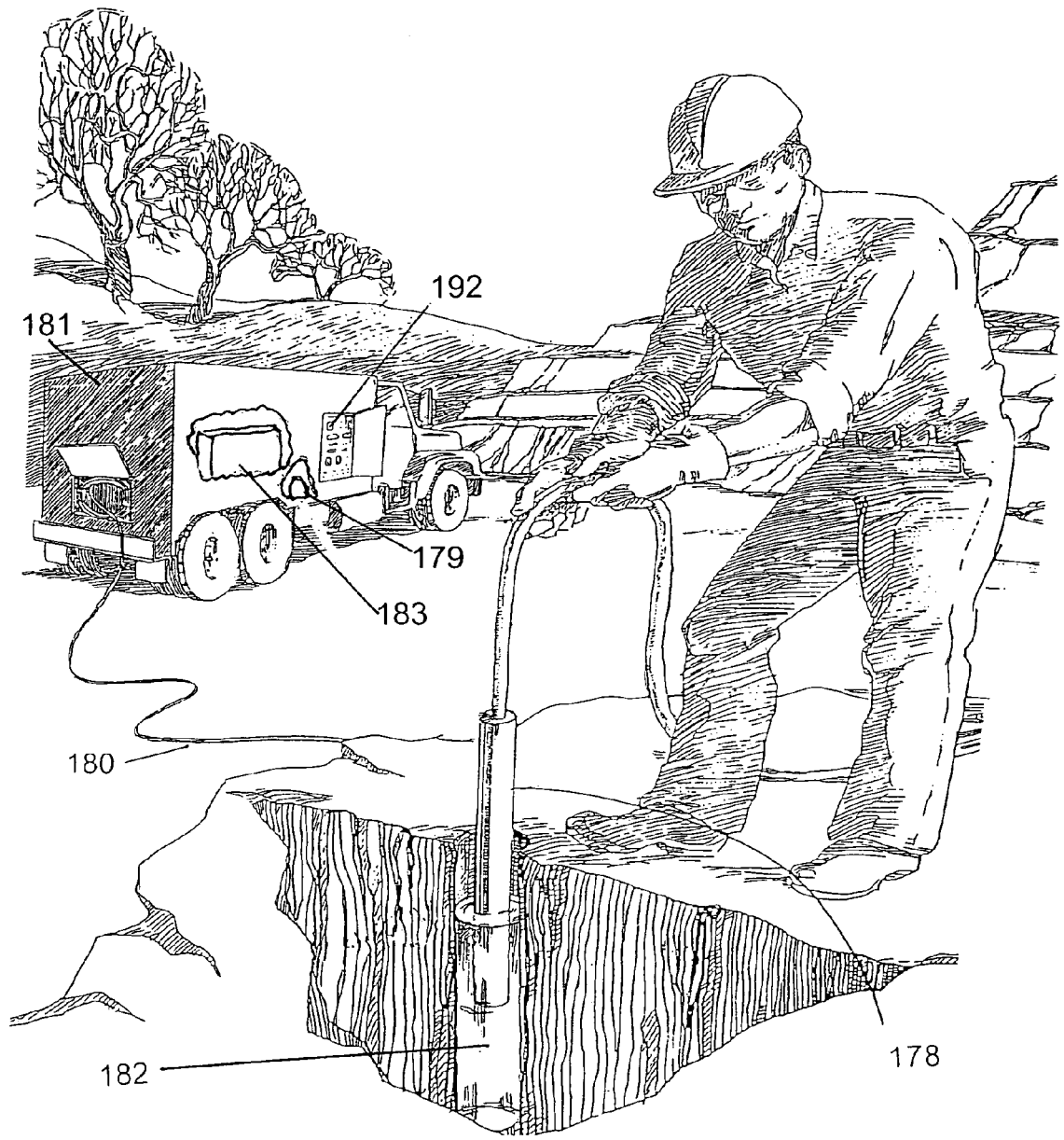
FIG. 22 shows a high energy electrohydraulic boulder breaker system (HEEB) of an embodiment of the present invention.
Figure 23:
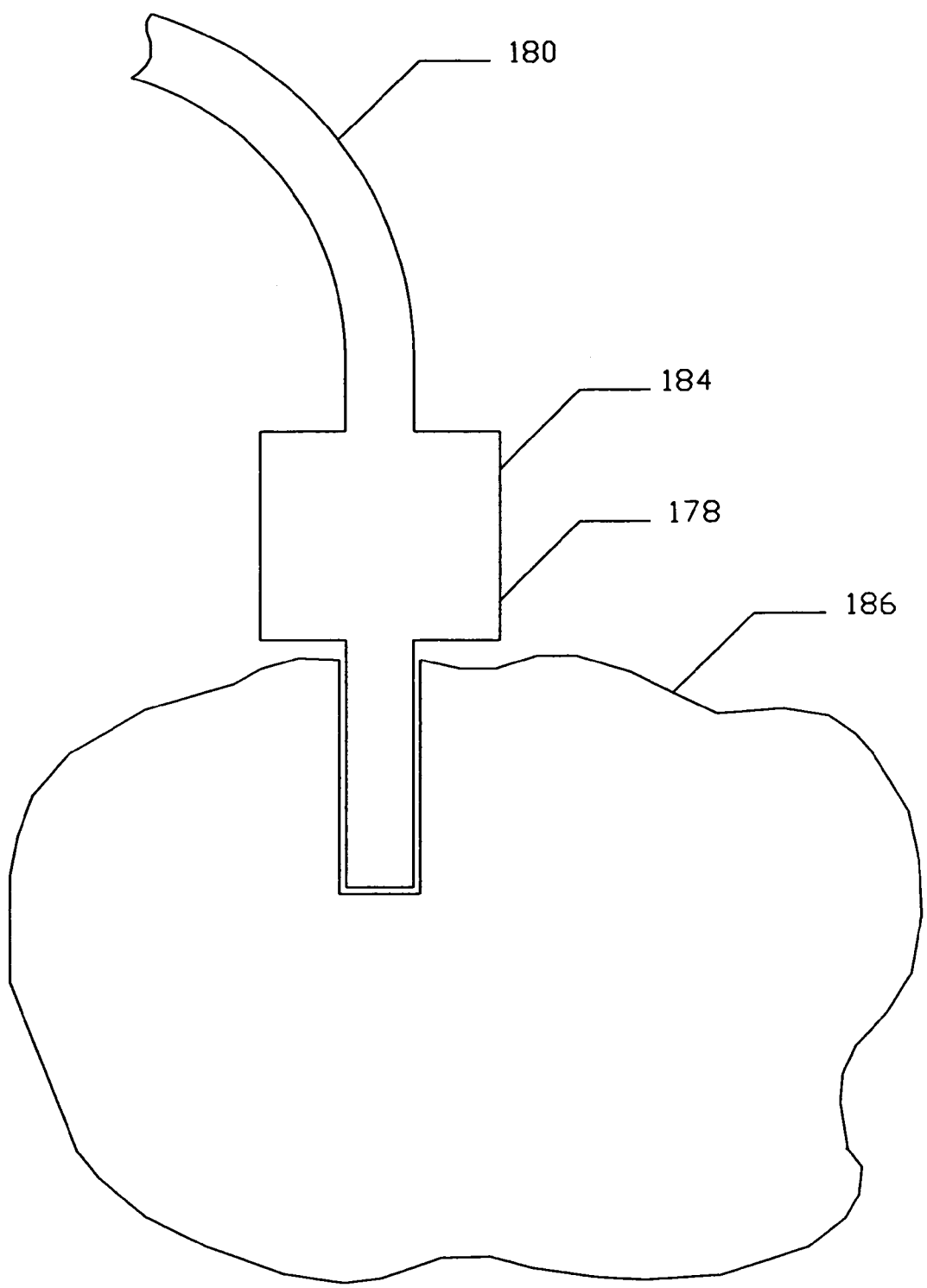
FIG. 23 shows a transducer of the embodiment of FIG. 22.

FIG. 22 shows the HEEB system disposed on truck 181, comprising transducer 178, power cable 180, and fluid 182 disposed in a hole. Transducer 178 breaks the boulder and cable 180 (which may be of any desired length such as, for example, 6-15 m long) connects transducer 178 to electric pulse generator 183 in truck 181. An embodiment of the invention comprises first drilling a hole into a boulder utilizing a conventional drill, filling the hole is filled with water or a specialized insulating fluid, and inserting HEEB transducer 178 into the hole in the boulder. FIG. 23 shows HEEB transducer 178 disposed in boulder 186 for breaking the boulder, cable 180, and energy storage module 184.

Main capacitor bank 183 (shown in FIG. 22) is first charged by generator 179 (shown in FIG. 22) disposed on truck 181. Upon command, control system 192 (shown in FIG. 22 and disposed, for example, in a truck) is closed connecting capacitor bank 183 to cable 180. The electrical pulse travels down cable 180 to energy storage module 184 where it pulse-charges capacitor set 158 (example shown in FIG. 24), or other energy storage devices (example shown in FIG. 25).

Figure 24:
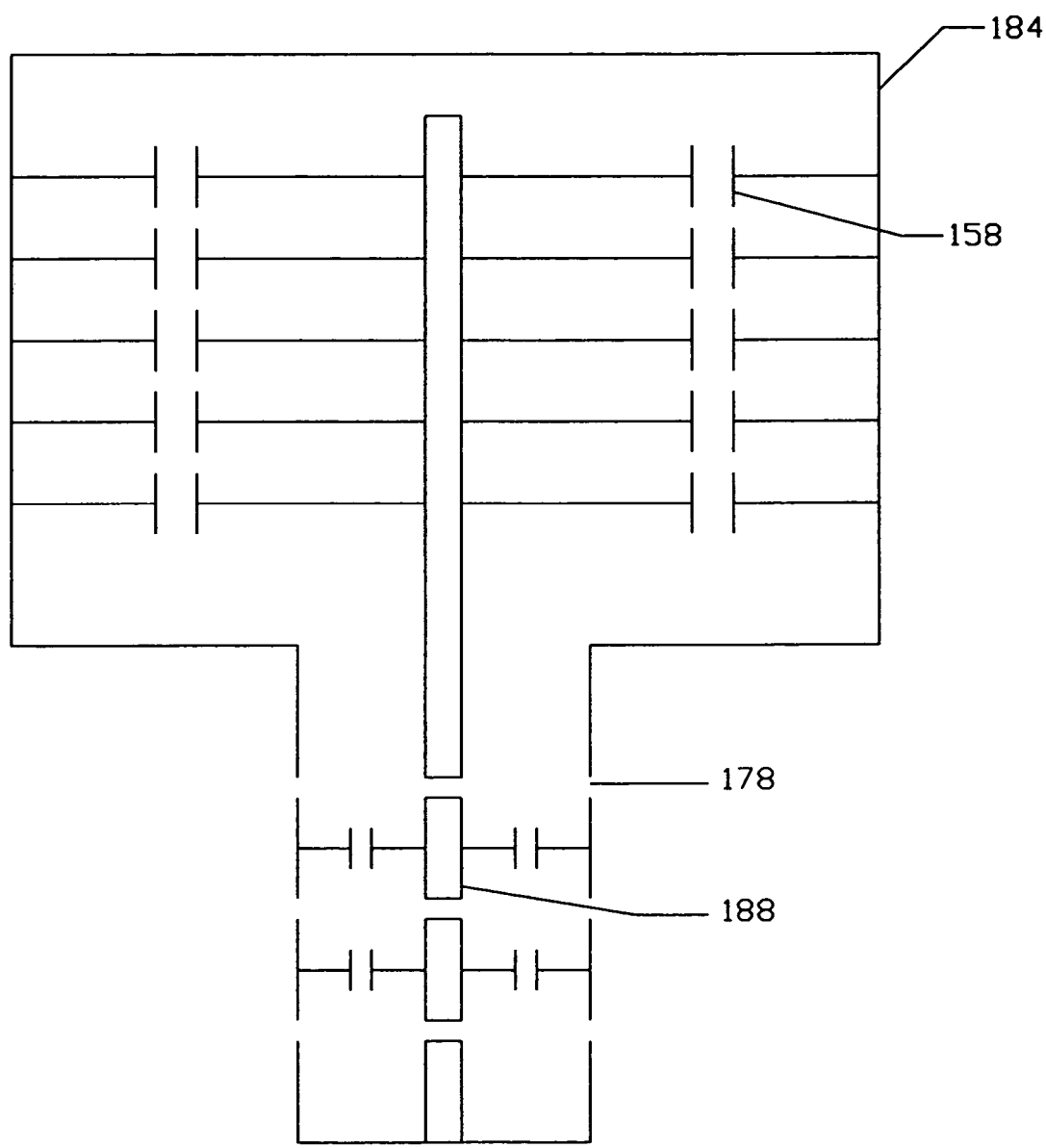
FIG. 24 shows the details of the an energy storage module and transducer of the embodiment of FIG. 22.

FIG. 24 shows the details of the HEEB energy storage module 184 and transducer 178, showing capacitors 158 in module 184, and floating electrodes 188 in transducer 178.

Figure 25:
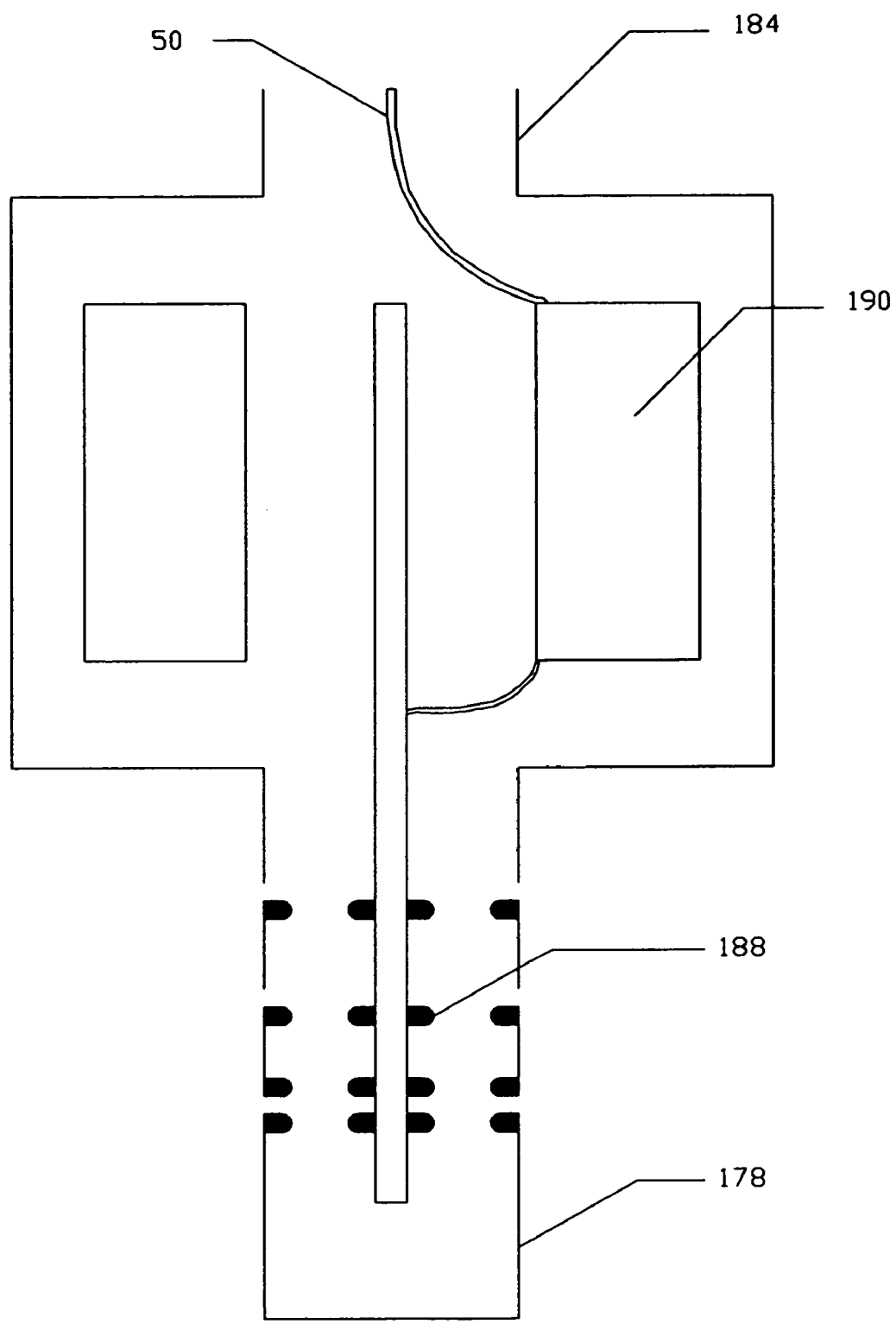
FIG. 25 shows the details of an inductive storage embodiment of the high energy electrohydraulic boulder breaker energy storage module and transducer of an embodiment of the present invention.

FIG. 25 shows the details of the inductive storage embodiment of HEEB energy storage module 184 and transducer 178, showing inductive storage inductors 190 in module 184, and showing the transducer embodiment of parallel electrode gaps 188 in transducer 178. The transducer embodiment of parallel electrode gaps (FIG. 25) and series electrode gaps (FIG. 24) can reach be used alternatively with either the capacitive energy store 158 of FIG. 24 or the inductive energy store 190 of FIG. 25.

These capacitors/devices are connected to the probe of the transducer assembly where the electrodes that create the pressure wave are located. The capacitors increase in voltage from the charge coming through the cable from the main capacitor bank until they reach the breakdown voltage of the electrodes inside the transducer assembly. When the fluid gap at the tip of the transducer assembly breaks down (acting like a switch), current then flows from the energy storage capacitors or inductive devices through the gap. Because the energy storage capacitors are located very close to the transducer tip, there is very little inductance in the circuit and the peak current through the transducers is very high. This high peak current results in a high energy transfer efficiency from the energy storage module capacitors to the plasma in the fluid. The plasma then expands, creating a pressure wave in the fluid, which fractures the boulder.

Figure 26:
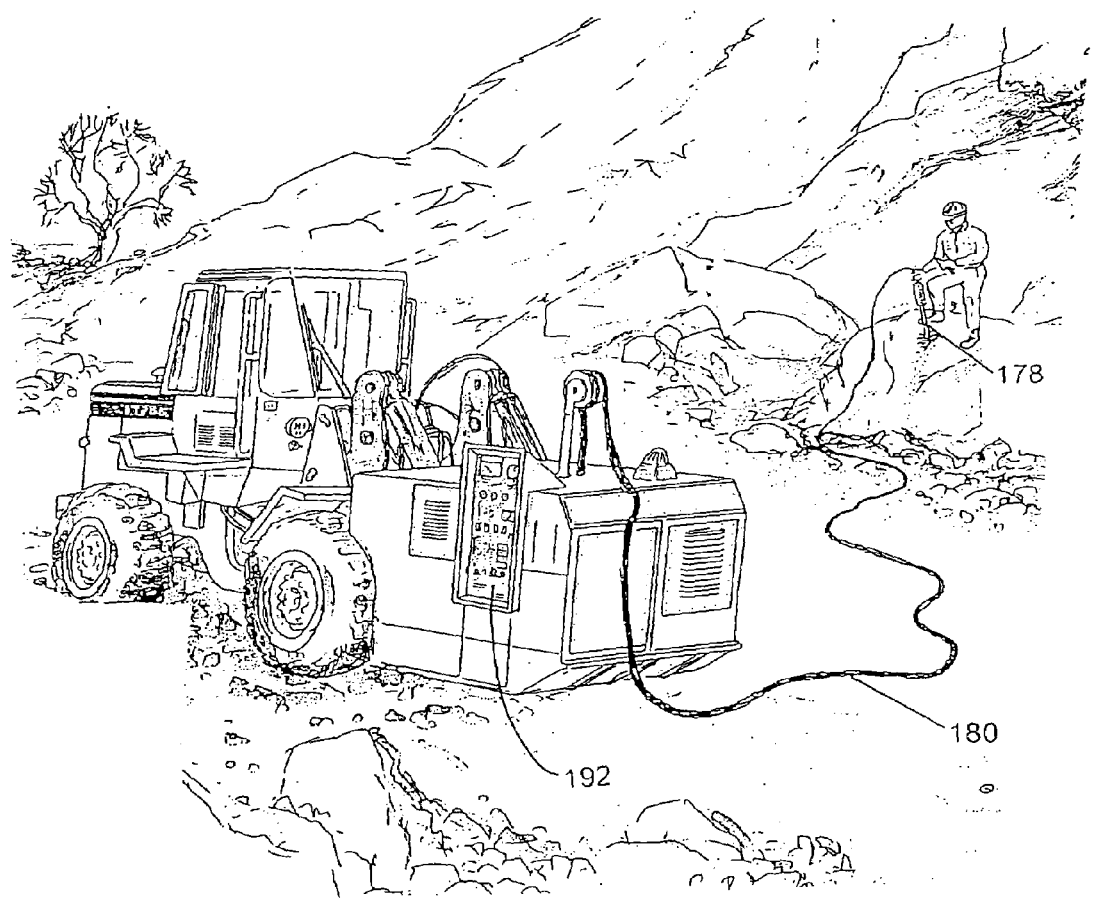
FIG. 26 shows the embodiment of the high energy electrohydraulic boulder breaker disposed on a tractor for use in a mining environment.

The HEEB system may be transported and used in various environments including, but not limited to, being mounted on a truck as shown in FIG. 22 for transport to various locations, used for either underground or aboveground mining applications as shown in FIG. 26, or used in construction applications. FIG. 26 shows an embodiment of the HEEB system placed on a tractor for use in a mining environment and showing transducer 178, power cable 180, and control panel 192.

Therefore, the HEEB does not rely on transmitting the boulder-breaking current over a cable to connect the remote (e.g., truck mounted) capacitor bank to an electrode or transducer located in the rock hole. Rather, the HEEB puts the high current energy storage directly at the boulder. Energy storage elements, such as capacitors, are built into the transducer assembly. Therefore, this embodiment of the present invention increases the peak current through the transducer and thus improves the efficiency of converting electrical energy to pressure energy for breaking the boulder. This embodiment of the present invention also significantly reduces the amount of current that has to be conducted through the cable thus reducing losses, increasing energy transfer efficiency, and increasing cable life.

An embodiment of the present invention improves the efficiency of coupling the electrical energy to the plasma into the water and hence to the rock by using a multi-gap design. A problem with the multi-gap water spark gaps has been getting all the gaps to ignite because the cumulative breakdown voltage of the gaps is much higher than the breakdown voltage of a single gap. However, if capacitance is placed from the intermediate gaps to ground (FIG. 24), each gap ignites at a voltage similar to the ignition voltage of a single gap. Thus, a large number of gaps can be ignited at a voltage of approximately a factor of 2 greater than the breakdown voltage for a single gap. This improves the coupling efficiency between the pulsed power module and the energy deposited in the fluid by the transducer. Holes in the transducer case are provided to let the pressure from the multiple gaps out into the hole and into the rock to break the rock (FIG. 24).

In another embodiment, the multi-gap transducer design can be used with a conventional pulsed power system, where the capacitor bank is placed at some distance from the material to be fractured, a cable is run to the transducer, and the transducer is placed in the hole in the boulder. Used with the HEEB, it provides the advantage of the much higher peak current for a given stored energy.

Thus, an embodiment of the present invention provides a transducer assembly for creating a pressure pulse in water or some other liquid in a cavity inside a boulder or some other fracturable material, said transducer assembly incorporating energy storage means located directly in the transducer assembly in close proximity to the boulder or other fracturable material. The transducer assembly incorporates a connection to a cable for providing charging means for the energy storage elements inside the transducer assembly. The transducer assembly includes an electrode means for converting the electrical current into a plasma pressure source for fracturing the boulder or other fracturable material.

Preferably, the transducer assembly has a switch located inside the transducer assembly for purposes of connecting the energy storage module to said electrodes. Preferably, in the transducer assembly, the cable is used to pulse charge the capacitors in the transducer energy storage module. The cable is connected to a high voltage capacitor bank or inductive storage means to provide the high voltage pulse.

In another embodiment, the cable is used to slowly charge the capacitors in the transducer energy storage module. The cable is connected to a high voltage electric power source.

Preferably, the switch located at the primary capacitor bank is a spark gap, thyratron, vacuum gap, pseudo-spark switch, mechanical switch, or some other means of connecting a high voltage or high current source to the cable leading to the transducer assembly.

In another embodiment, the transducer electrical energy storage utilizes inductive storage elements.

Another embodiment of the present invention provides a transducer assembly for the purpose of creating pressure waves from the passage of electrical current through a liquid placed between one or more pairs of electrodes, each gap comprising two or more electrodes between which current passes. The current creates a phase change in the liquid, thus creating pressure in the liquid from the change of volume due to the phase change. The phase change includes a change from liquid to gas, from gas to plasma, or from liquid to plasma.

Preferably, in the transducer, more than one set of electrodes is arranged in series such that the electrical current flowing through one set of electrodes also flows through the second set of electrodes, and so on. Thus, a multiplicity of electrode sets can be powered by the same electrical power circuit.

In another embodiment, in the transducer, more than one set of electrodes is arranged in parallel such that the electrical current is divided as it flows through each set of electrodes (FIG. 25). Thus, a multiplicity of electrode sets can be powered by the same electrical power circuit.

Preferably, a plurality of electrode sets is arrayed in a line or in a series of straight lines.

Figure 27:
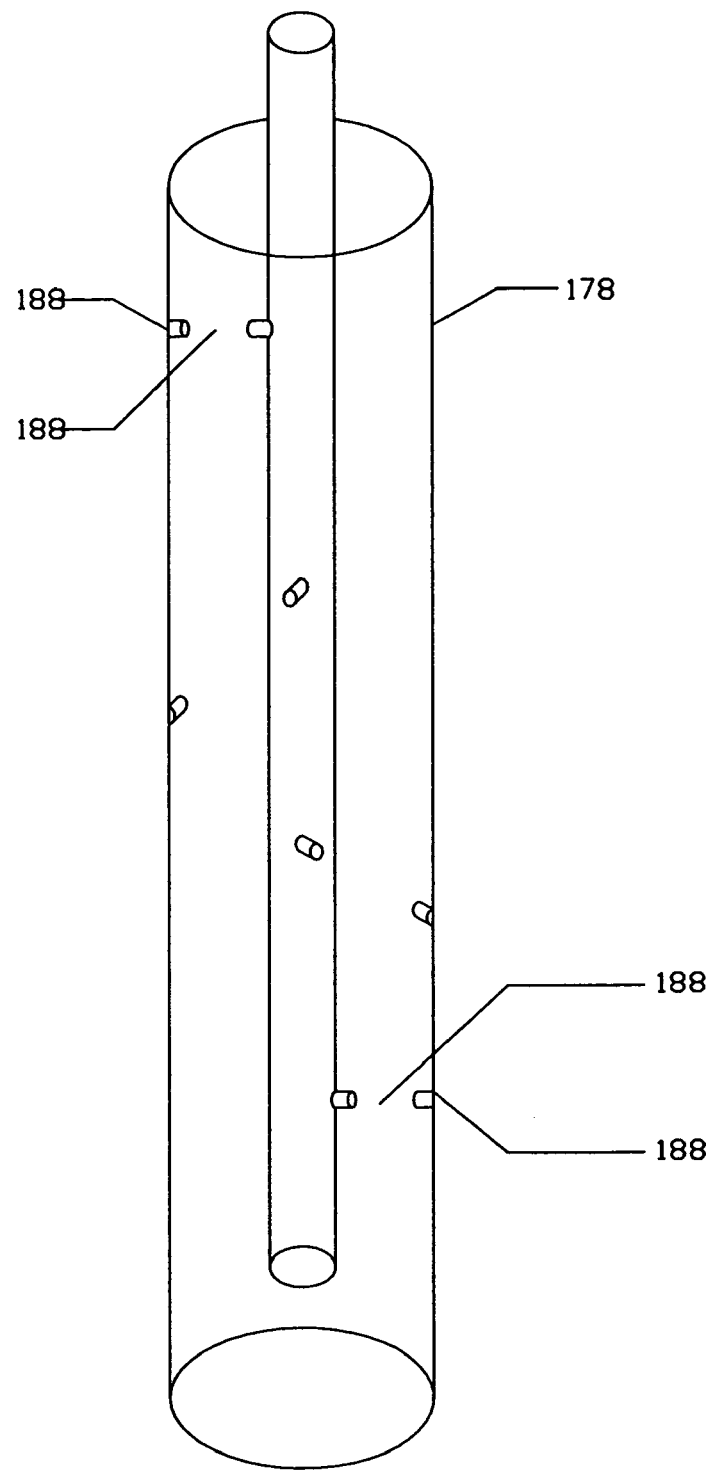
FIG. 27 shows a geometric arrangement of the embodiment of parallel electrode gaps in a transducer in a spiral configuration.

In another embodiment, the plurality of electrode sets is alternatively arrayed to form a geometric figure other than a straight line, including, but not limited to, a curve, a circle (FIG. 25), or a spiral. FIG. 27 shows a geometric arrangement of the embodiment comprising parallel electrode gaps 188 in the transducer 178, in a spiral configuration.

Preferably, the electrode sets in the transducer assembly are constructed in such a way as to provide capacitance between each intermediate electrode and the ground structure of the transducer (FIG. 24).

In another embodiment, in the plurality of electrode sets, the capacitance of the intermediate electrodes to ground is formed by the presence of a liquid between the intermediate electrode and the ground structure.

In another embodiment, in the plurality of electrode sets, the capacitance is formed by the installation of a specific capacitor between each intermediate electrode and the ground structure (FIG. 24). The capacitor can use solid or liquid dielectric material.

Figure 28:
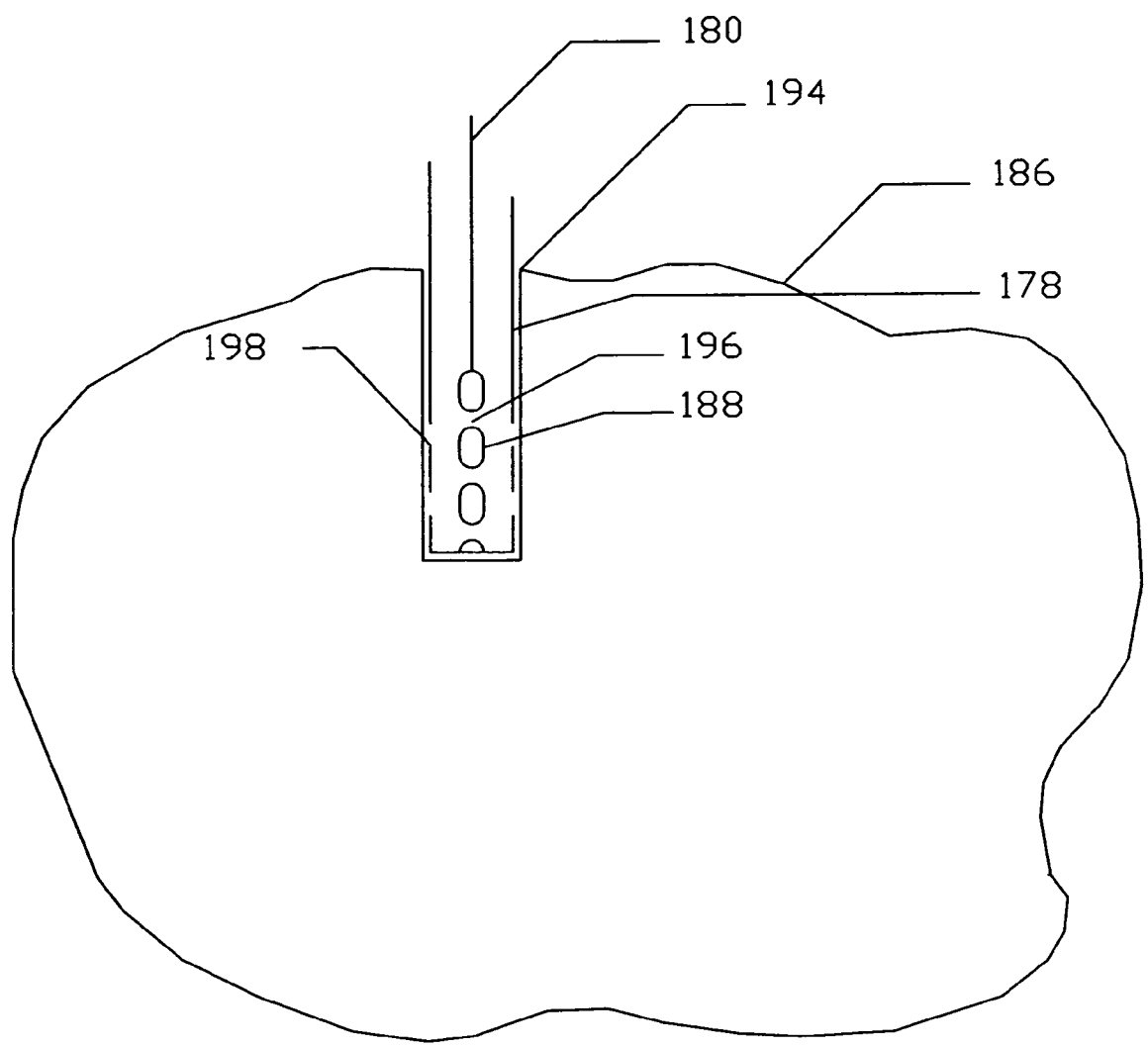
FIG. 28 shows details of another embodiment of an electrohydraulic boulder breaker system.

In another embodiment, in the plurality of electrode sets, capacitance is provided between the electrode sets from electrode to electrode. The capacitance can be provided either by the presence of the fracturing liquid between the electrodes or by the installation of a specific capacitor from an intermediate electrode between electrodes as shown in FIG. 28. FIG. 28 shows the details of the HEEB transducer 178 installed in hole 194 in boulder 186 for breaking the boulder. Shown are cable 180, the floating electrodes 188 in the transducer and liquid between the electrodes 196 that provides capacitive coupling electrode to electrode. Openings 198 in the transducer which allow the pressure wave to expand into the rock hole are also shown.

Preferably in the multi-electrode transducer, the electrical energy is supplied to the multi-gap transducer from an integral energy storage module.

Preferably in the multi-electrode transducer, the energy is supplied to the transducer assembly via a cable connected to an energy storage device located away from the boulder or other fracturable material.

Virtual Electrode Electro-Crushing Process

Another embodiment of the present invention comprises a method for crushing rock by passing current through the rock using electrodes that do not touch the rock. In this method, the rock particles are suspended in a flowing or stagnant water column, or other liquid of relative permittivity greater than the permittivity of the rock being fractured. Water is preferred for transporting the rock particles because the dielectric constant of water is approximately 80 compared to the dielectric constant of rock which is approximately 3.5 to 12.

Figure 29:
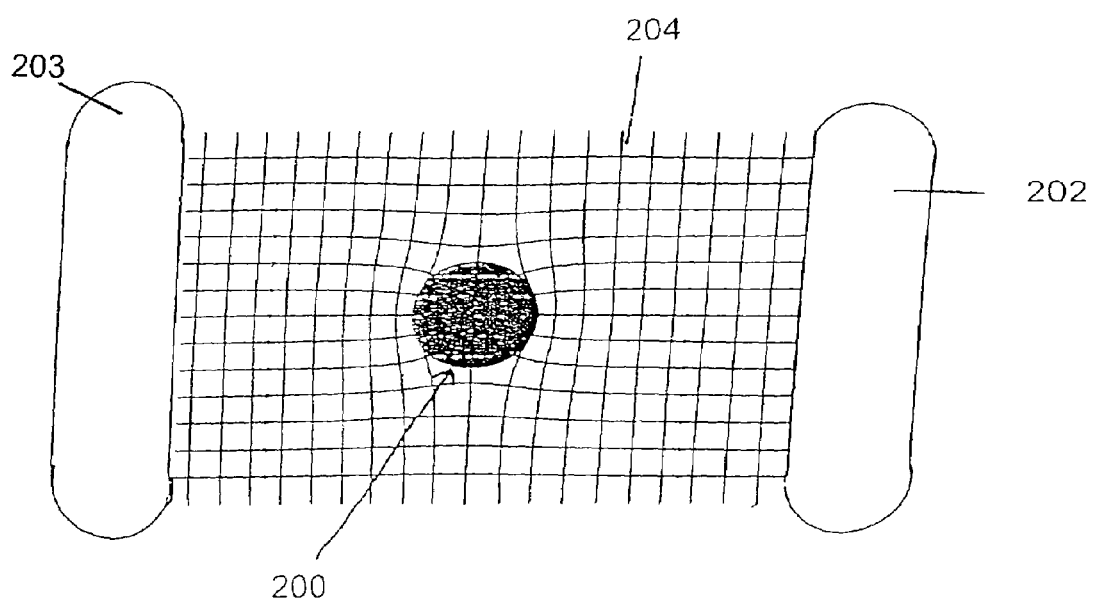
FIG. 29 shows an embodiment of a virtual electrode electrocrushing process.

In the preferred embodiment, the water column moves the rock particles past a set of electrodes as an electrical pulse is provided to the electrodes. As the electric field rises on the electrodes, the difference in dielectric constant between the water and the rock particle causes the electric fields to be concentrated in the rock, forming a virtual electrode with the rock. This is illustrated in FIG. 29 showing rock particle 200 between high voltage electrodes 202 and ground electrode 203 in liquid 204 whose dielectric constant is significantly higher than that of rock particle 200.

The difference in dielectric constant concentrated the electric fields in the rock particle. These high electric fields cause the rock to break down and current to flow from the electrode, through the water, through the rock particles, through the conducting water, and back to the opposite electrode. In this manner, many small particles of rock can be disintegrated by the virtual electrode electrocrushing method without any of them physically contacting both electrodes. The method is also suitable for large particles of rock.

Thus, it is not required that the rocks be in contact with the physical electrodes and so the rocks need not be sized to match the electrode spacing in order for the process to function. With the virtual electrode electrocrushing method, it is not necessary for the rocks to actually touch the electrode, because in this method, the electric fields are concentrated in the rock by the high dielectric constant (relative permittivity) of the water or fluid. The electrical pulse must be tuned to the electrical characteristics of the column structure and liquid in order to provide a sufficient rate of rise of voltage to achieve the allocation of electric field into the rock with sufficient stress to fracture the rock.

Figure 30:
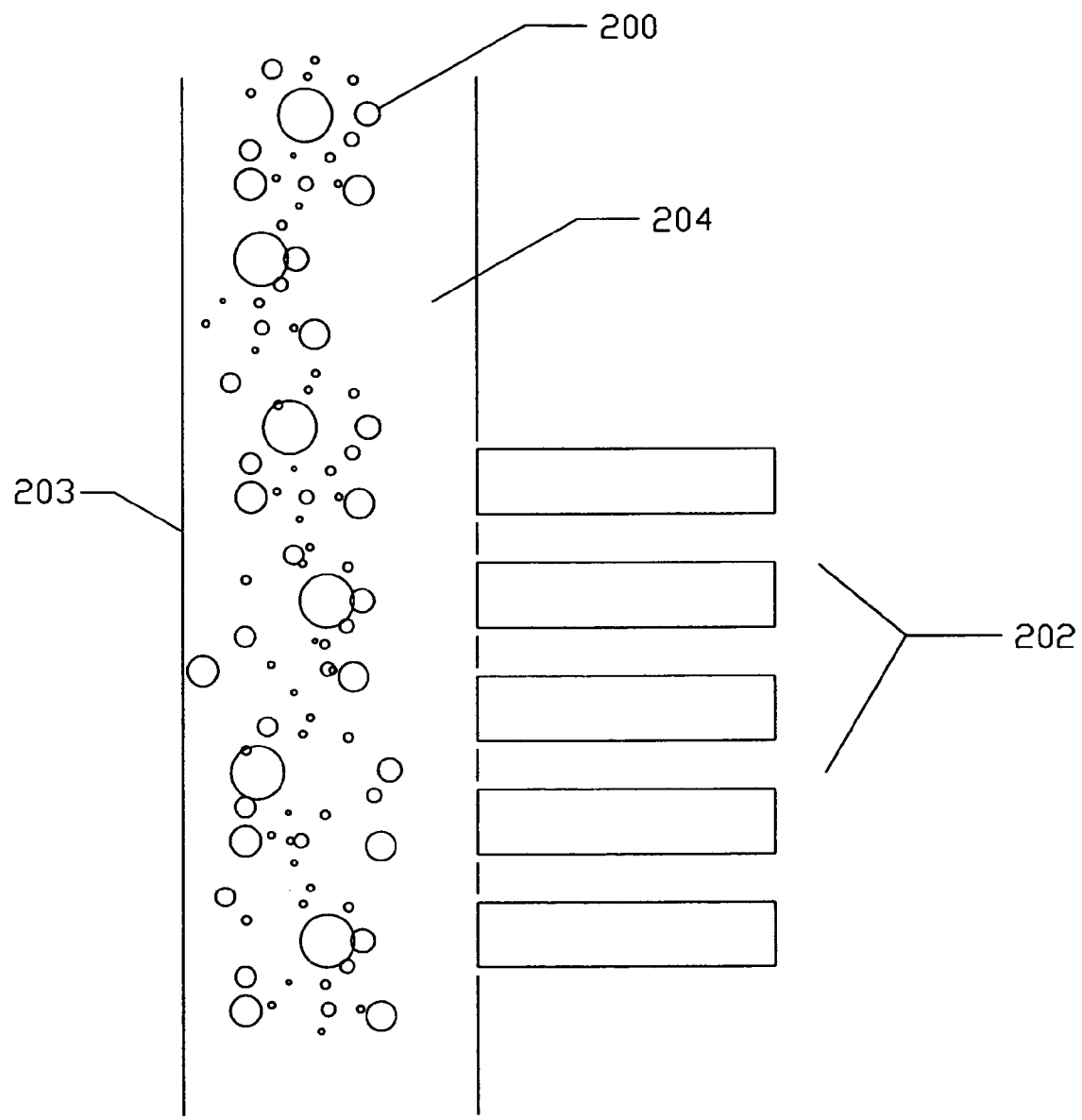
FIG. 30 shows an embodiment of the virtual electrode electrocrushing system comprising a vertical flowing fluid column.

Another embodiment of the present invention, illustrated in FIG. 30, comprises a reverse-flow electro-crusher wherein electrodes 202 send an electrocrushing current to mineral (e.g., rock) particles 200 and wherein water or fluid 204 flows vertically upward at a rate such that particles 200 of the size desired for the final product are swept upward, and whereas particles that are oversized sink downward.

As these oversized particles sink past the electrodes, a high voltage pulse is applied to the electrodes to fracture the particles, reducing them in size until they become small enough to become entrained by the water or fluid flow. This method provides a means of transporting the particles past the electrodes for crushing and at the same time differentiating the particle size.

The reverse-flow crusher also provides for separating ash from coal in that it provides for the ash to sink to the bottom and out of the flow, while the flow provides transport of the fine coal particles out of the crusher to be processed for fuel.

INDUSTRIAL APPLICABILITY

The invention is further illustrated by the following non-limiting example(s).

EXAMPLE 1

Figure 31:
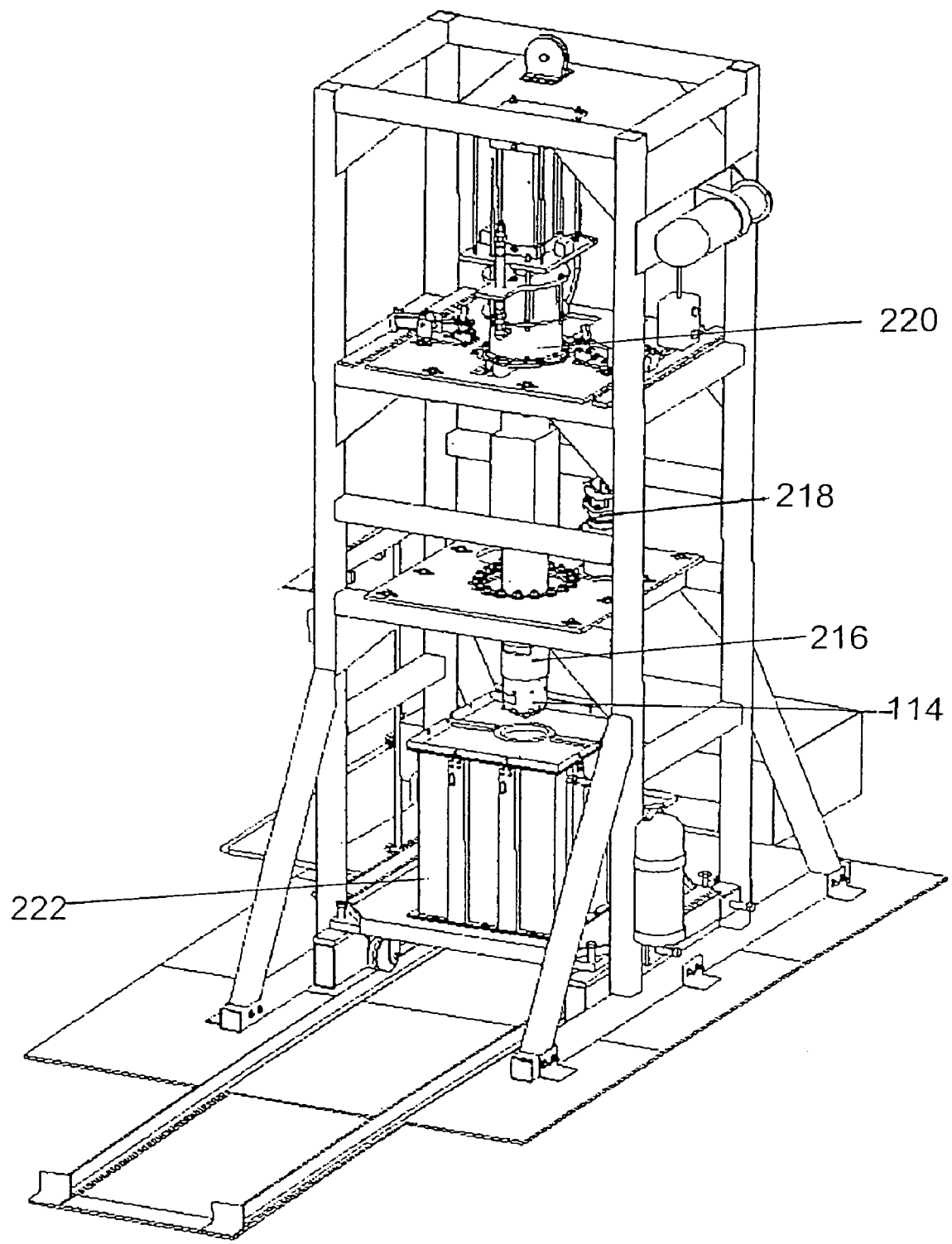
FIG. 31 shows a pulsed power drilling apparatus manufactured and tested in accordance with an embodiment of the present invention.

An apparatus utilizing FAST Drill technology in accordance with the present invention was constructed and tested. FIG. 31 shows FAST Drill bit 114, the drill stem 216, the hydraulic motor 218 used to turn drill stem 216 to provide power to mechanical teeth disposed on drill bit 114, slip ring assembly 220 used to transmit the high voltage pulses to the FAST bit 114 via a power cable inside drill stem 216, and tank 222 used to contain the rocks being drilled. A pulsed power system, contained in a tank (not shown), generated the high voltage pulses that were fed into the slip ring assembly. Tests were performed by conducting 150 kV pulses through drill stem 216 to the FAST Bit 114, and a pulsed power system was used for generating the 150 kV pulses. A drilling fluid circulation system was incorporated to flush out the cuttings. The drill bit shown in FIG. 5 was used to drill a 7 inch diameter hole approximately 12 inches deep in rock located in a rock tank. A fluid circulation system flushed the rock cuttings out of the hole, cleaned the cuttings out of the fluid, and circulated the fluid through the system.

EXAMPLE II

A high permittivity fluid comprising a mixture of castor oil and approximately 20% by volume butylene carbonate was made and tested in accordance with the present invention as follows.

1. Dielectric Strength Measurements.

Because this insulating formulation of the present invention is intended for high voltage applications, the properties of the formulation were measured in a high voltage environment. The dielectric strength measurements were made with a high voltage Marx bank pulse generator, up to 130 kV. The rise time of the Marx bank was less than 100 nsec. The breakdown measurements were conducted with 1-inch balls immersed in the insulating formulation at spacings ranging from 0.06 to 0.5 cm to enable easy calculation of the breakdown fields. The delay from the initiation of the pulse to breakdown was measured. FIG. 32 shows the electric field at breakdown plotted as a function of the delay time in microseconds. Also included are data from the Charlie Martin models for transformer oil breakdown and for deionized water breakdown (Martin, T. H., A. H. Guenther, M Kristiansen "J. C. Martin on Pulsed Power" Lernum Press, (1996)).

The breakdown strength of the formulation is substantially higher than transformer oil at times greater than 10 μsec. No special effort was expended to condition the formulation. It contained dust, dissolved water and other contaminants, whereas the Martin model is for very well conditioned transformer oil or water.

2. Dielectric Constant Measurements.

The dielectric constant was measured with a ringing waveform at 20 kV. The ringing high voltage circuit was assembled with 8-inch diameter contoured plates immersed in the insulating formulation at 0.5-inch spacing. The effective area of the plates, including fringing field effects, was calibrated with a fluid whose dielectric constant was known (i.e., transformer oil). An aluminum block was placed between the plates to short out the plates so that the inductance of the circuit could be measured with a known circuit capacitance. Then, the plates were immersed in the insulating formulation, and the plate capacitance was evaluated from the ringing frequency, properly accounting for the effects of the primary circuit capacitor. The dielectric constant was evaluated from that capacitance, utilizing the calibrated effective area of the plate. These tests indicated a dielectric constant of approximately 15.

3. Conductivity Measurements.

To measure the conductivity, the same 8-inch diameter plates used in the dielectric constant measurement were utilized to measure the leakage current. The plates were separated by 2-inch spacing and immersed in the insulating formulation. High voltage pulses, ranging from 70-150 kV were applied to the plates, and the leakage current flow between the plates was measured. The long duration current, rather than the initial current, was the value of interest, in order to avoid displacement current effects. The conductivity obtained was approximately 1 micromho/cm [$1 \times 10^{-6}$ (ohm-cm)$^{-1}$].

4. Water Absorption.

The insulating formulation has been tested with water content up to 2000 ppm without any apparent effect on the dielectric strength or dielectric constant. The water content was measured by Karl Fisher titration.

5. Energy Storage Comparison.

The energy storage density of the insulating formulation of the present invention was shown to be substantially higher than that of transformer oil, but less than that of deionized water. Table 1 shows the energy storage comparison of the insulating formulation, a transformer oil, and water in the 1 μsec and 10 μsec breakdown time scales. The energy density (in joules/cm$^3$) was calculated from the dielectric constant ($\epsilon$, $\epsilon_0$) and the breakdown electric field ($E_{bd}$~kV/cm). The energy storage density of the insulating formulation is approximately one-fourth that of water at 10 microseconds. The insulating formulation did not require continuous conditioning, as did a water dielectric system. After about 12 months of use, the insulating formulation remained useable without conditioning and with no apparent degradation.

TABLE 1

Comparison of Energy Storage Density

| Fluid | Dielectic Constant | Time = 1 μsec | | Time = 10 μsec | |
|---|---|---|---|---|---|
| | | kV/cm | Energy Density | kV/cm | Energy Density |
| Insulating formulation | 15 | 380 | 9.59E−02 | 325 | 7.01E−02 |
| Trans. Oil | 2.2 | 500 | 2.43E−02 | 235 | 5.38E−03 |
| Water | 80 | 600 | 1.27E+00 | 280 | 2.78E−01 |

Energy density = ½ * $\in$ * $\in_0$ * $E_{bd}$ * $E_{bd}$~j/cm$^3$

6. Summary.

A summary of the dielectric properties of the insulating formulation of the present invention is shown in Table 2. Applications of the insulating formulation include high energy density capacitors, large-scale pulsed power machines, and compact repetitive pulsed power machines.

TABLE 2

Summary of Formulation Properties

| | |
|---|---|
| Dielectric Strength = | 380 kV/cm (1 μsec) |
| Dielectric Constant = | 15 |
| Conductivity = | 1e−6 mho/cm |
| Water absorption = | up to 2000 ppm with no apparent ill effects |

The preceding examples can be repeated with similar success by substituting the generically or specifically described compositions, biomaterials, devices and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above, and of the corresponding application(s), are hereby incorporated by reference.

What is claimed is:

1. A pulsed power drilling apparatus for passing a pulsed electrical current through a substrate, the apparatus comprising:
   a drill bit;
   at least one set of at least two electrodes disposed on said drill bit defining therebetween at least one electrode gap, said electrodes of each said set oriented substantially along a face of said drill bit to pass current through the substrate;
   a high-voltage pulsed power generator linked to said drill bit, delivering a pulsed current between said electrodes and through the substrate;
   an electrical power source powering said pulsed power generator;
   an electrical conduction conduit sending high-voltage pulses from said high-voltage pulse generator to said drill bit; and
   an insulating drilling fluid having a dielectric strength of at least 300 kV/cm (1 μsec).

2. The apparatus of claim 1 wherein at least one of said electrodes is compressible toward said drill bit.

3. The apparatus of claim 1 wherein said drill bit is rotatable.

4. The apparatus of claim 1 further comprising a plurality of mechanical teeth disposed on at least one of said electrodes.

5. The apparatus of claim 1 wherein said insulating drilling fluid has an electrical conductivity less than approximately $10^{-5}$ mho/cm.

6. The apparatus of claim 1 wherein said insulating drilling fluid comprises
   a dielectric constant of at least approximately 6.

7. The apparatus of claim 1 wherein at least one of said electrode sets is arranged on said bit in a configuration that is asymmetric relative to an axis of rotational symmetry of said bit.

8. The apparatus of claim 1 wherein at least one of said electrode sets is arranged on said bit in a configuration that is symmetric relative to an axis of rotational symmetry of said bit.

9. The apparatus of claim 1 wherein at least one of a first of said electrode sets is arranged on said bit in a configuration that is asymmetric relative to an axis of rotational symmetry of said bit and at least one of a second of said electrode sets is arranged on said bit in a configuration that is symmetric relative to an axis of rotational symmetry of said bit.

10. The apparatus of claim 1 further comprising a control system that varies or changes either or both a pulse repetition rate and a pulse energy on at least one asymmetric electrode as a function of azimuthal angle as it rotates to change a direction of drilling.

11. The apparatus of claim 1 further comprising a control system that varies or changes either or both a pulse repetition rate and a pulse energy among separate sets of electrodes to change a direction of drilling.

12. The apparatus of claim 1 further comprising a reamer and a reamer drag bit disposed in a drill string so that said reamer and said drill bit operate in conjunction with said drill string.

13. The apparatus of claim 12 wherein said reamer comprises a plurality of mechanical cutting teeth arranged on a reamer housing a geometry selected from the group consisting of a substantially conical shape, a substantially cylindrical shape, and a combination thereof.

14. The apparatus of claim 1 wherein at least one set of electrodes is disposed so that it touches the substrate and another of said electrodes is disposed so that it functions in close proximity to, or touches, the substrate for current to pass through the substrate.

15. The apparatus of claim 1 wherein said pulsed power generator is disposed on or near said drill bit for providing electrical current to said drill bit.

16. The apparatus of claim 1 wherein said pulse generator delivers high voltage pulses of at least approximately 100 kV.

17. The apparatus of claim 1 wherein said pulse generator comprises a capacitor bank utilizing at least one switch selected from the group consisting of a spark gap switch, a thyratron switch, a vacuum gap switch, a pseudo-spark switch, a mechanical switch, a solid state switch and a combination thereof.

18. The apparatus of claim 1 further comprising passages disposed in said bit and in which a flow of fluid is disposed for flushing debris.

19. The apparatus of claim 1 comprising a plurality of electrode sets arranged in an array.

20. The apparatus of claim 19 further comprising a steering device, steering said array by varying a repetition rate or pulse energy of some of said electrode sets relative to other said drill bits in said array.

21. The apparatus of claim 12 further comprising at least one component disposed in said drill string selected from the group consisting of a pulsed power supply, a generator to power said pulsed power, a gearbox to drive said generator, a rotating interface, a mud motor to drive said generator gearbox, a mud motor to rotate said bit, a rotating interface, a non-rotating drill pipe, a rotating rigid drill pipe, a downhole mud motor, a mud turbine, and a combination thereof.

22. The apparatus of claim 12 further comprising at least one component disposed in said drill string and selected from the group consisting of a continuous mud pipe, a rigid multi-section pipe, a rigid multi-section pipe with conductors buried in a wall of said pipe, and a rotating magnetic interface.

23. The apparatus of claim 1 wherein said bit comprises a shape selected from the group consisting of a substantially conical shape, a substantially conical shape with a plurality of conical angles, a truncated conical shape, a substantially cylindrical shape, a substantially radiused shape, and a substantially planar shape.

24. The apparatus of claim 1 wherein at least one of said electrodes comprises a shape selected from the group consisting of a radiused face where said electrode contacts the substrate, a completed circle shape, a partial circle shape, a complete ellipse shape, a partial ellipse shape, a complete parabola shape, and a partial parabola shape.

25. A pulsed power drilling apparatus for passing a pulsed electrical current through a substrate, the apparatus comprising:
   a drill bit;
   at least one set of at least two electrodes disposed on said drill bit defining therebetween at least one electrode gap, said electrodes of each said set oriented substantially along a face of said drill bit to pass current through the substrate;
   a high-voltage pulsed power generator linked to said drill bit, delivering a pulsed current between said electrodes and through the substrate;

an electrical power source powering said pulsed power generator; and an electrical conduction conduit sending high-voltage pulses from said high-voltage pulse generator to said drill bit, wherein at least one of a first of said electrode sets is arranged on said bit in a configuration that is asymmetric relative to an axis of rotational symmetry of said bit and at least one of a second of said electrode sets is arranged on said bit in a configuration that is symmetric relative to an axis of rotational symmetry of said bit.

26. The apparatus of claim 25 wherein at least one of said electrodes is compressible toward said drill bit.

27. The apparatus of claim 25 wherein said drill bit is rotatable.

28. The apparatus of claim 25 comprising a plurality of drill bits arranged in an array.

29. The apparatus of claim 25 further comprising a control system that varies or changes either or both a pulse repetition rate and a pulse energy on at least one asymmetric electrode as a function of azimuthal angle as it rotates to change a direction of drilling.

30. The apparatus of claim 25 further comprising a control system that varies or changes either or both a pulse repetition rate and a pulse energy among separate sets of electrodes to change a direction of drilling.

31. A pulsed power drilling apparatus for passing a pulsed electrical current through a substrate, the apparatus comprising:

a drill bit;

at least one set of at least two electrodes disposed on said drill bit defining therebetween at least one electrode gap, said electrodes of each said set oriented substantially along a face of said drill bit to pass current through the substrate;

a high-voltage pulsed power generator linked to said drill bit, delivering a pulsed current between said electrodes and through the substrate;

an electrical power source powering said pulsed power generator;

an electrical conduction conduit sending high-voltage pulses from said high-voltage pulse generator to said drill bit; and a control system that varies or changes either or both a pulse repetition rate and a pulse energy on at least one asymmetric electrode as a function of azimuthal angle as it rotates to change a direction of drilling.

32. The apparatus of claim 31 wherein at least one of said electrodes is compressible toward said drill bit.

33. The apparatus of claim 31 wherein said drill bit is rotatable.

34. The apparatus of claim 31 wherein at least one of a first of said electrode sets is arranged on said bit in a configuration that is asymmetric relative to an axis of rotational symmetry of said bit and at least one of a second of said electrode sets is arranged on said bit in a configuration that is symmetric relative to an axis of rotational symmetry of said bit.

35. The apparatus of claim 31 comprising a plurality of electrode sets arranged in an array.

36. A pulsed power drilling apparatus for passing a pulsed electrical current through a substrate, the apparatus comprising:

a drill bit;

at least one set of at least two electrodes disposed on said drill bit defining therebetween at least one electrode gap, said electrodes of each said set oriented substantially along a face of said drill bit to pass current through the substrate;

a high-voltage pulsed power generator linked to said drill bit, delivering a pulsed current between said electrodes and through the substrate;

an electrical power source powering said pulsed power generator;

an electrical conduction conduit sending high-voltage pulses from said high-voltage pulse generator to said drill bit; and a control system that varies or changes either or both a pulse repetition rate and a pulse energy among separate sets of electrodes to change a direction of drilling.

37. The apparatus of claim 36 wherein at least one of said electrodes is compressible toward said drill bit.

38. The apparatus of claim 36 wherein said drill bit is rotatable.

39. The apparatus of claim 36 wherein at least one of said electrode sets is arranged on said bit in a configuration that is asymmetric relative to an axis of rotational symmetry of said bit.

40. The apparatus of claim 36 wherein at least one of said electrode sets is arranged on said bit in a configuration that is symmetric relative to an axis of rotational symmetry of said bit.

41. The apparatus of claim 36 comprising a plurality of electrode sets arranged in an array.

42. A pulsed power drilling apparatus for passing a pulsed electrical current through a substrate, the apparatus comprising:

a drill bit;

at least one set of at least two electrodes disposed on said drill bit defining therebetween at least one electrode gap, said electrodes of each said set oriented substantially along a face of said drill bit to pass current through the substrate;

a high-voltage pulsed power generator linked to said drill bit, delivering a pulsed current between said electrodes and through the substrate;

an electrical power source powering said pulsed power generator;

an electrical conduction conduit sending high-voltage pulses from said high-voltage pulse generator to said drill bit; and a plurality of electrode sets arranged in an array.

43. The apparatus of claim 42 further comprising a steering device, steering said array by varying a repetition rate or pulse energy of some of said electrode sets relative to other said electrode sets in said array.

44. The apparatus of claim 42 wherein at least one of said electrodes is compressible toward said drill bit.

45. The apparatus of claim 42 wherein said drill bit is rotatable.

* * * * *